US012557227B2

(12) United States Patent
Han et al.

(10) Patent No.: US 12,557,227 B2
(45) Date of Patent: Feb. 17, 2026

(54) FOLDABLE ELECTRONIC DEVICES

(71) Applicant: Samsung Display Co., Ltd., Yongin-si (KR)

(72) Inventors: Jiwon Han, Yongin-si (KR); Sungu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 398 days.

(21) Appl. No.: 18/220,731

(22) Filed: Jul. 11, 2023

(65) Prior Publication Data

US 2024/0215185 A1 Jun. 27, 2024

(30) Foreign Application Priority Data

Dec. 26, 2022 (KR) .................. 10-2022-0185023

(51) Int. Cl.
*H05K 5/02* (2006.01)
*H05K 5/03* (2006.01)

(52) U.S. Cl.
CPC ............. *H05K 5/0243* (2013.01); *H05K 5/03* (2013.01)

(58) Field of Classification Search
CPC .......... H05K 5/0243; H05K 5/03; G06F 1/16; G06F 1/1637; G06F 1/1652;
(Continued)

(56) References Cited

U.S. PATENT DOCUMENTS 8,724,304 B2 * 5/2014 Raff .................. G06F 1/1637
455/575.1
8,811,032 B2 * 8/2014 Ladouceur .......... H04M 1/0268
361/679.13
(Continued)

FOREIGN PATENT DOCUMENTS

JP       2021-107990 A    7/2021
KR   10-2020-0100385 A    8/2020
(Continued)

OTHER PUBLICATIONS

International Search Report dated Mar. 22, 2024, corresponding to PCT/KR2023/021502, 3 pages.

*Primary Examiner* — Anthony M Haughton
*Assistant Examiner* — Theron S Milliser
(74) *Attorney, Agent, or Firm* — Womble Bond Dickinson (US) LLP

(57) ABSTRACT

An electronic device includes: a display including: a folding area to be folded during a folding operation; and a first area and a second area at opposite sides with respect to a folding area extending in a first direction; a protective layer above the display, and including a first edge located around the first area, and a second edge located around the second area; and a first housing decoration corresponding to the first area and covering an upper surface of the first edge, the first housing decoration having an inner side surface in which a first groove is located. An inner circumferential surface of the first groove includes a first-1 inner circumferential surface facing the upper surface of the first edge, the first-1 inner circumferential surface being upwardly inclined with respect to a direction parallel to the first area, and the first edge is located in the first groove.

20 Claims, 12 Drawing Sheets

(58) Field of Classification Search
CPC .......... G06F 1/1656; G09F 9/30; G09F 9/301; H10K 50/84; H10K 77/111; H10K 2102/311
See application file for complete search history.

(56) References Cited

U.S. PATENT DOCUMENTS

| | | | |
|---|---|---|---|
| 9,256,250 B2* | 2/2016 | Raff | G06F 1/00 |
| 9,625,948 B2* | 4/2017 | Zhang | G06F 1/1628 |
| 9,817,444 B2* | 11/2017 | Raff | H10K 77/111 |
| 10,140,947 B2* | 11/2018 | Song | G09F 9/301 |
| 10,448,522 B2 | 10/2019 | Han | |
| 10,488,888 B2* | 11/2019 | Raff | H04L 1/00 |
| 10,545,538 B2* | 1/2020 | Jia | H04M 1/0268 |
| 10,698,449 B2* | 6/2020 | Raff | G06F 1/1652 |
| 10,877,522 B2* | 12/2020 | Jia | H04M 1/0268 |
| 10,908,644 B2 | 2/2021 | Han et al. | |
| 11,240,923 B2* | 2/2022 | Wang | G06F 1/1616 |
| 11,320,865 B2* | 5/2022 | Raff | G06F 1/1652 |
| 11,444,260 B2 | 9/2022 | Choi et al. | |
| 11,450,690 B2 | 9/2022 | Wei et al. | |
| 11,528,349 B2* | 12/2022 | Kim | H05K 3/361 |
| 11,592,865 B2 | 2/2023 | Moon et al. | |
| 11,809,228 B2* | 11/2023 | Hsu | G06F 1/1681 |
| 11,849,549 B2* | 12/2023 | Feng | G06F 1/1681 |
| 11,903,149 B2 | 2/2024 | Sunwoo et al. | |
| 11,930,127 B2* | 3/2024 | Kim | G06F 1/1683 |
| 12,066,867 B2* | 8/2024 | Raff | H10K 77/111 |
| 12,167,552 B2* | 12/2024 | Feng | G06F 1/1652 |
| 12,273,474 B2* | 4/2025 | Kim | H05K 3/361 |
| 12,314,080 B2* | 5/2025 | Seo | G06F 1/1637 |
| 2013/0033844 A1* | 2/2013 | Ladouceur | H04M 1/0268 361/807 |
| 2013/0279088 A1* | 10/2013 | Raff | H04L 1/00 361/679.01 |
| 2014/0218856 A1* | 8/2014 | Raff | H04L 1/00 361/679.21 |
| 2016/0231783 A1* | 8/2016 | Raff | G06F 1/00 |
| 2017/0060183 A1* | 3/2017 | Zhang | G06F 1/1605 |
| 2017/0186400 A1* | 6/2017 | Song | G06F 1/1643 |
| 2018/0059729 A1* | 3/2018 | Raff | G06F 1/1637 |
| 2018/0192527 A1 | 7/2018 | Yun et al. | |
| 2019/0339742 A1* | 11/2019 | Jia | G06F 1/1681 |
| 2020/0089282 A1* | 3/2020 | Raff | G06F 1/1637 |
| 2020/0110444 A1* | 4/2020 | Jia | H04M 1/022 |
| 2020/0133338 A1* | 4/2020 | Han | G06F 1/1652 |
| 2020/0162596 A1* | 5/2020 | Kim | G06F 1/1656 |
| 2020/0319678 A1* | 10/2020 | Raff | G06F 1/1601 |
| 2021/0076517 A1* | 3/2021 | Wang | H05K 5/0217 |
| 2022/0141969 A1* | 5/2022 | Cho | B32B 7/12 361/807 |
| 2022/0253105 A1* | 8/2022 | Raff | G06F 1/1601 |
| 2022/0312612 A1 | 9/2022 | An et al. | |
| 2022/0361347 A1* | 11/2022 | Feng | G06F 1/1624 |
| 2023/0027462 A1* | 1/2023 | Hsu | G06F 1/1652 |
| 2023/0071540 A1* | 3/2023 | Kim | G06F 1/1652 |
| 2023/0259162 A1* | 8/2023 | Seo | H04M 1/0237 361/679.27 |
| 2024/0064916 A1* | 2/2024 | Feng | H05K 5/0018 |
| 2024/0195895 A1* | 6/2024 | Kim | H05K 1/148 |
| 2024/0215185 A1* | 6/2024 | Han | G09F 9/30 |
| 2024/0370059 A1* | 11/2024 | Raff | G06F 1/1601 |

FOREIGN PATENT DOCUMENTS

| | | |
|---|---|---|
| KR | 10-2021-0047753 A | 4/2021 |
| KR | 10-2021-0095205 A | 7/2021 |
| KR | 10-2021-0101428 A | 8/2021 |
| KR | 10-2022-0015916 A | 2/2022 |
| KR | 10-2022-0053464 A | 4/2022 |
| KR | 10-2022-0065575 A | 5/2022 |

* cited by examiner

FOLDABLE ELECTRONIC DEVICES

CROSS-REFERENCE TO RELATED APPLICATION

This application claims priority to and the benefit of Korean Patent Application No. 10-2022-0185023, filed on Dec. 26, 2022, in the Korean Intellectual Property Office, the entire disclosure of which is incorporated by reference herein.

BACKGROUND

1. Field

Aspects of one or more embodiments of the present disclosure relate to a foldable electronic device, and more particularly, to a foldable electronic device having a slim bezel.

2. Description of the Related Art

An electronic device may include a display panel on which images are displayed. The display panel may display images by receiving information regarding the images.

Recently, an electronic device, for example, such as a foldable electronic device, which may be folded or unfolded, and a display has been introduced. However, a foldable electronic device having a slim bezel may be desired.

The above information disclosed in this Background section is for enhancement of understanding of the background of the present disclosure, and therefore, it may contain information that does not constitute prior art.

SUMMARY

In the case of a foldable electronic device, however, when a folding operation is performed or an external impact is applied, a slip phenomenon may occur in the display or a protective layer for protecting the display, and during the slip, the protective layer may contact or collide with a housing structure, and thus, may be damaged.

One or more embodiments of the present disclosure are directed to a foldable electronic device having a slim bezel. However, the present disclosure is not limited thereto.

Additional aspects and features will be set forth, in part, in the description that follows, and in part, will be apparent from the description, or may be learned by practicing one or more of the presented embodiments of the present disclosure.

According to one or more embodiments of the present disclosure, an electronic device includes: a display configured to be foldable with respect to a folding axis extending in a first direction, the display including: a folding area configured to be folded during a folding operation; and a first area and a second area at opposite sides with respect to the folding area; a protective layer above the display, and including a first edge located around the first area, and a second edge located around the second area; and a first housing decoration corresponding to the first area and covering an upper surface of the first edge, the first housing decoration having an inner side surface in which a first groove is located. An inner circumferential surface of the first groove includes a first-1 inner circumferential surface facing the upper surface of the first edge, the first-1 inner circumferential surface being upwardly inclined with respect to a direction parallel to the first area, and the first edge is located in the first groove.

In an embodiment, the inner circumferential surface of the first groove may include a first-2 inner circumferential surface facing a lower surface of the first edge, and the first-2 inner circumferential surface may extend in the direction parallel to the first area.

In an embodiment, the first edge may be upwardly inclined with respect to the direction parallel to the first area.

In an embodiment, an angle of an upward inclination of the first-1 inner circumferential surface may be greater than or equal to an angle of an upward inclination of the first edge.

In an embodiment, an inner side surface of the first groove may be spaced from the first edge.

In an embodiment, in a plan view in an unfolded state, an area of the protective layer may be greater than an area of the display.

In an embodiment, the first edge may protrude further than a side surface of the display.

In an embodiment, in a folded state, the first edge may face the second edge.

In an embodiment, the electronic device may further include a second housing decoration corresponding to the second area, the second housing decoration covering an upper surface of the second edge, and having an inner side surface in which a second groove is located. An inner circumferential surface of the second groove may include a second-1 inner circumferential surface facing an upper surface of the second edge, the second-1 inner circumferential surface being upwardly inclined with respect to a direction parallel to the second area, and the second edge may be located in the second groove.

In an embodiment, in a plan view in an unfolded state, the first edge and the second edge may be located along a second direction crossing the first direction.

In an embodiment, the second edge may protrude further than another side surface of the display.

In an embodiment, a distance between the first edge and the second edge in an unfolded state may be less than a distance between a bottom surface of the first groove and a bottom surface of the second groove in the unfolded state.

In an embodiment, the first housing decoration may include: a first decoration body covering a side surface of the display and a side surface of the first edge; and a first decoration head extending from the first decoration body in a direction parallel to the first area, and covering the upper surface of the first edge.

In an embodiment, the first decoration body may include the first groove in the inner side surface thereof, and the first-1 inner circumferential surface may form a continuous surface with a lower surface of the first decoration head.

In an embodiment, the protective layer may include: a glass layer over the display; and a polymer layer over the glass layer, and having a greater area than that of the glass layer in a plan view in an unfolded state.

In an embodiment, in the unfolded state, the polymer layer may include a protrusion protruding further than the glass layer in a second direction crossing the first direction, and the protrusion may include a first protrusion corresponding to the first area, and a second protrusion corresponding to the second area.

In an embodiment, the first protrusion may be upwardly inclined with respect to a direction parallel to the display that is in the unfolded state.

In an embodiment, a portion of the first protrusion may be located in the first groove.

In an embodiment, the second protrusion may be upwardly inclined with respect to a direction parallel to the display that is in the unfolded state.

In an embodiment, a portion of the second protrusion may be located in the second groove.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
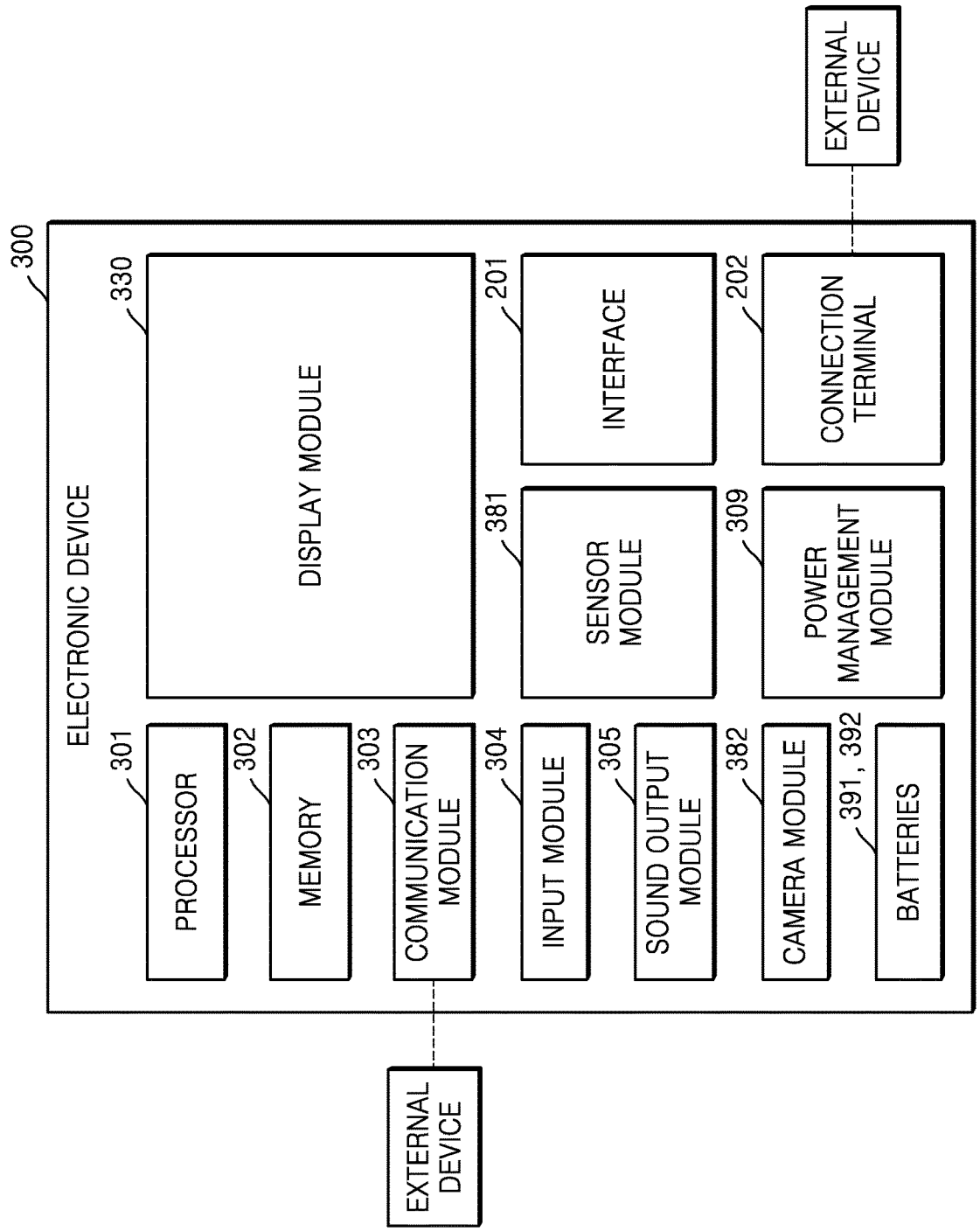
FIG. 1 is a schematic block diagram of an electronic device according to one or more embodiments.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B.

Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components (e.g., some of the various modules) according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic block diagram of an electronic device according to one or more embodiments.

As shown in FIG. 1, an electronic device 300 may include a processor 301, memory 302, a communication module (e.g., a communication circuit) 303, a display module (e.g., a display or a touch-display) 330, an input module (e.g., an input circuit) 304, a sound output module (e.g., a sound output circuit) 305, a sensor module (e.g., a sensor) 381, an interface 201, a camera module (e.g., a camera) 382, and batteries 391 and 392.

In the electronic device 300 according to some embodiments, at least one of the above components (e.g., the camera module) may be omitted as needed or desired, or one or more other components (e.g., a power management module (e.g., a power management controller) 309, an audio module (e.g., an audio circuit and/or a speaker), a haptic module (e.g., a haptic circuit), a connection terminal 202, an antenna module (e.g., an antenna), a subscriber identification module (e.g., a subscriber identification circuit), and/or the like) may be added to the above components. In the electronic device 300 according to some embodiments, some of the aforementioned components may be integrated with each other into one component.

The processor 301 may execute instructions stored in the memory 302, to perform arithmetic operations and control other devices. The processor 301 may mainly be a central processing unit (CPU), an application processor (AP), a graphics processing unit (GPU), or the like. Also, a CPU, an AP, or a GPU may include one or more cores therein, and may operate according to an operation voltage and clock signals. The CPU or AP may include several cores that are optimized for serial processing, while the GPU may include thousands of smaller and more efficient cores designed for parallel processing.

According to an embodiment, as part of data processing or an arithmetic operation, the processor 301 may store, in the memory 302, commands or data transmitted from the other components (e.g., the sensor module 381 or the communication module 303), may process the commands or data stored in the memory 302, and may store result data in the memory 302. According to an embodiment, the processor 301 may include a main processor (e.g., a CPU or an AP) or a coprocessor (e.g., a GPU, a Neural Processing Unit (NPU), an image signal processor, a sensor hub processor, or a communication processor) that may be operated independently or together with the main processor. For example, when the electronic device 300 includes the main processor and the coprocessor, the coprocessor may be set to use lower power than that of the main processor, or may be specialized for a designated function. The coprocessor may be separated from the main processor or may form a part thereof.

The memory 302 stores data used to support various functions of the electronic device 300. The memory 302 may store application programs (or applications) executed in the electronic device 300, pieces of data or instructions used to operate the electronic device 300, and/or the like. At least some of the application programs may be downloaded from an external server through wireless communication. Also, the application programs may be stored in the memory 302, and may be executed to perform operations (or functions) of the electronic device 300 by the processor 301.

The memory 302 may include volatile memory or nonvolatile memory. The memory may include at least one kind of storage medium from among a flash memory kind, a hard disk kind, a multimedia card micro kind of memory, a card-kind of memory (e.g., secure digital (SD) memory, extreme digital (XD) memory, and/or the like), random access memory (RAM), static random access memory (SRAM), read-only memory (ROM), electrically erasable programmable read-only memory (EEPROM), programmable read-only memory (PROM), magnetic memory, a magnetic disk, or an optical disk. Also, the memory 302 may include web storage configured to perform a storage function on the Internet.

The communication module 303 receives/transmits information from/to a base station or an external device have a communication function through an antenna. The communication module 303 may support the establishment of a direct (e.g., wired) communication channel or a wireless communication channel between the electronic device 300 and an external device or a server, and the communication using the established communication channel. The communication module 303 may include a modulator, a demodulator, a signal processor, and the like. Also, the communication module 303 may perform a wired communication function.

Wireless communication denotes communication that uses communication facilities established in advance by mobile carriers and a wireless network using frequencies of the communication facilities. In this case, the communication module 303 may be used in various wireless communication systems, such as code division multiple access (CDMA), frequency division multiple access (FDMA), time division multiple access (TDMA), orthogonal frequency division multiple access (OFDMA), or single carrier frequency division multiple access (SC-FDMA), and may also be used in $3^{rd}$ generation partnership project (3GPP) long term evolution (LTE), and the like. Also, not only 5G communication, which has been recently commercialized, but next-generation communication, such as 6G, which is scheduled for commercialization later, may be used. Further, in the present specification, a network that has been previously installed may be used without being limited to a wireless communication method.

Also, Bluetooth, Bluetooth Low Energy (BLE), Beacon, Radio Frequency Identification (RFID), Near Field Communication (NFC), Infrared Data Association (IrDA), Ultra Wideband (UWB), Zigbee, and/or the like may be used as short-range communication technology.

The display module 330 may visually provide information to the outside of the electronic device 300 (e.g., to a user). The display module 330 may include, for example, a display, a hologram device, or a control circuit for controlling a projector and the devices. According to an embodiment, the display module 330 may include a touch sensor for detecting touches, and/or a pressure sensor for measuring the intensity of pressure generated by the touches. The display module 330 included in the electronic device 300 according to an embodiment is described below in more detail.

The input module 304 may receive commands or data to be used in the components (e.g., the processor 301) of the electronic device 300 from the outside of the electronic device 300 (e.g., from a user). The input module 304 may include, for example, a microphone, a mouse, a keyboard, a key (e.g., a button), or a digital pen (e.g., a stylus pen).

The sound output module 305 may output a sound signal to the outside of the electronic device 300. The sound output module 305 may include, for example, a speaker or a receiver. The speaker may be used for general purposes, such as the playback of multimedia or recordings. The receiver may be used to receive incoming calls. According to an embodiment, the receiver may be separated from the speaker or may form a portion thereof.

The sensor module 381 may detect an operation state (e.g., power or temperature) of the electronic device 300 or an external environment state (e.g., a user state), and generate an electrical signal or a data value corresponding to the detected operation state. According to an embodiment, the sensor module 381 may include, for example, a gesture sensor, a gyroscope sensor, an air pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 201 may support one or more designated protocols that may be used to connect the electronic device 300 to the external device directly or wirelessly. According to an embodiment, the interface 201 may include, for example, a high definition multimedia interface (HDMI), a universal serial bus (USB) interface, a secure digital (SD) card interface, or an audio interface.

The camera module 382 may capture still and moving images. According to an embodiment, the camera module 382 may include one or more lenses, image sensors, image signal processors, or flashes.

The batteries 391 and 392 may supply power to at least one component of the electronic device 300. According to an embodiment, the batteries 391 and 392 may include, for example, a primary battery that is not rechargeable, a rechargeable secondary battery, or a rechargeable fuel cell.

The connection terminal 202 may include a connector through which the electronic device 300 is physically connected to the external device. According to an embodiment, the connection terminal 202 may include, for example, an HDMI connector, a USB connector, an SD card connector, or an audio connector (e.g., a headphone connector).

The power management module 309 may manage power supplied to the electronic device 300. According to an embodiment, the power management module 309 may be realized, for example, as at least a portion of a Power Management Integrated Circuit (PMIC).

Figure 2:
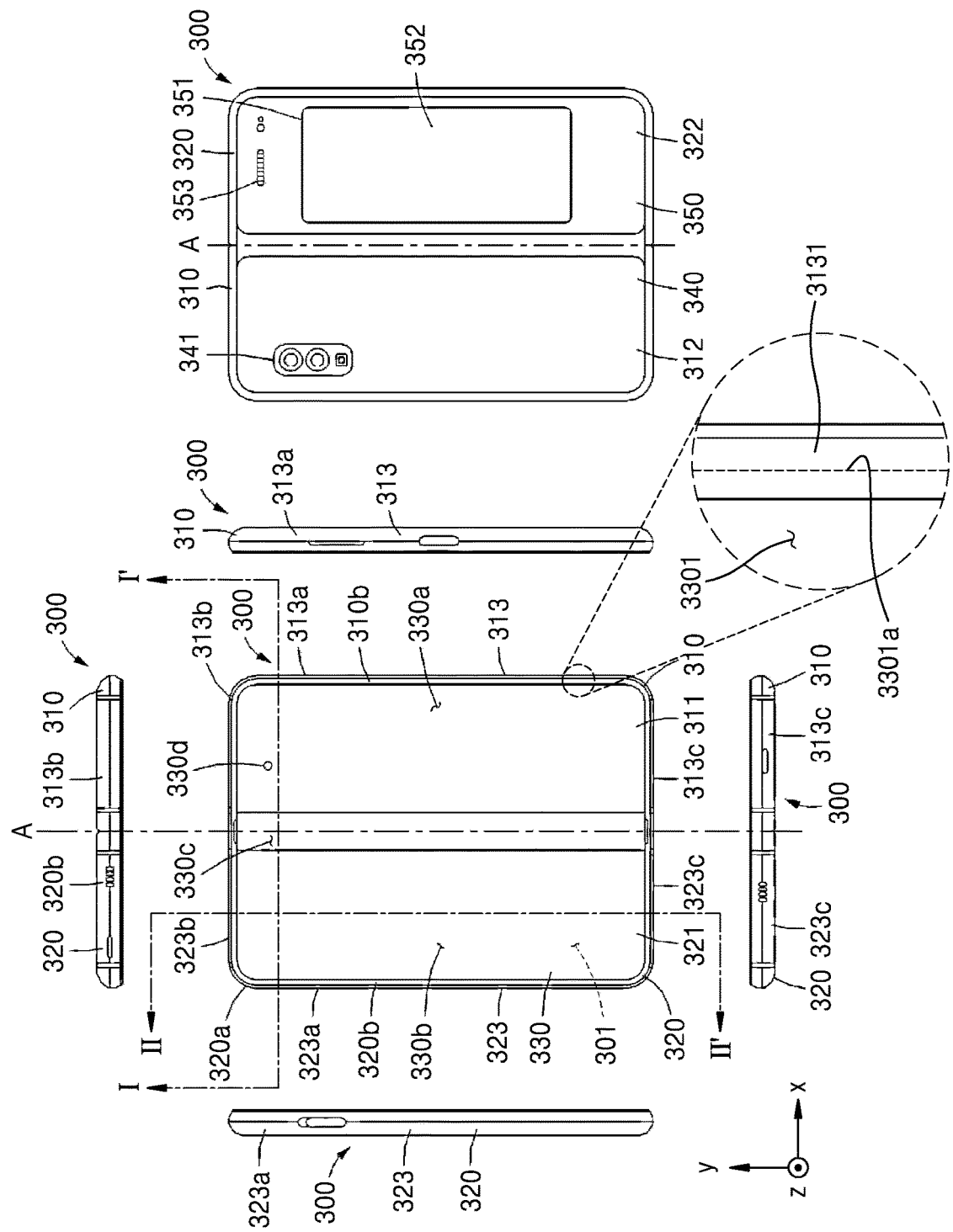
FIG. 2 is a diagram schematically showing an unfolded state of the electronic device of FIG. 1.
Figure 3:
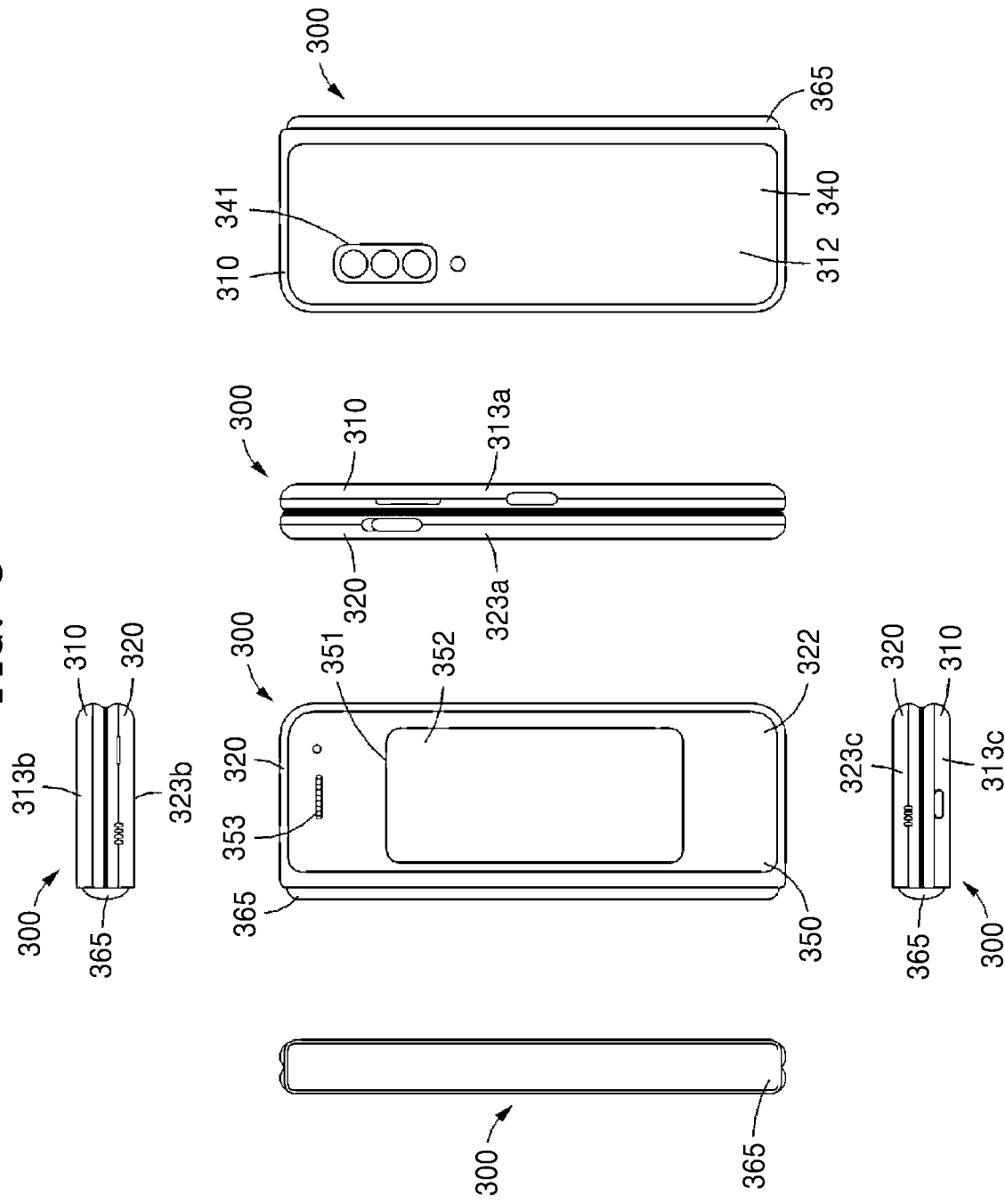
FIG. 3 is a diagram schematically showing a folded state of the electronic device of FIG. 1.

FIG. 2 is a diagram showing an unfolded state of the electronic device of FIG. 1, and FIG. 3 is a diagram showing a folded state of the electronic device of FIG. 1.

As shown in FIG. 2, the electronic device 300 may be a foldable electronic device. The electronic device 300 may include a pair of housing structures 310 and 320 (e.g., foldable housing structures), which are rotatably connected (e.g., coupled to or attached to) each other by a hinge structure (e.g., a hinge structure 364 of FIG. 3), so that the housing structures 310 and 320 may be folded with respect to each other. The electronic device 300 may include a hinge cover (e.g., a hinge cover 365 of FIG. 3) covering foldable portions of the housing structures 310 and 320, and the display module (e.g., a flexible display, a foldable display, or a first display) 330 arranged in a space formed by the housing structures 310 and 320. In the present specification, a surface on which the display module 330 displays visual information may be defined as a front surface of the electronic device 300, and a surface opposite to the front surface may be defined as a rear surface of the electronic device 300. Also, a surface surrounding (e.g., around a periphery of) a space between the front surface and the rear surface may be defined as side surfaces of the electronic device 300.

The pair of housing structures 310 and 320 may include a first housing structure 310, a second housing structure 320, a first rear surface cover 340, and a second rear surface cover 350. The housing structures 310 and 320 of the electronic device 300 are not limited to the forms and connections illustrated in FIGS. 2 and 3, and may be variously modified in other shapes or by variously different combinations and/or connections of the components. In another embodiment, for example, the first housing structure 310 may be integrally formed with the first rear surface cover 340, and the second housing structure 320 may be integrally formed with the second rear surface cover 350.

The first housing structure 310 and the second housing structure 320 may be arranged on both sides (e.g., opposite sides) of the electronic device 300, and may be symmetrical or substantially symmetrical to each other with respect to a folding axis A (e.g., an A axis). According to an embodiment, angles or distances formed by the first housing structure 310 and the second housing structure 320 may differ depending on whether the electronic device 300 is in a flat state (e.g., an unfolded state), a folded state, or an intermediate state.

In an embodiment, unlike the second housing structure 320, the first housing structure 310 further includes a sensor area 330d where at least one sensor is arranged, but in the other areas different from the sensor area 330d, the first housing structure 310 may be symmetrical to or substantially symmetrical to the second housing structure 320. In another embodiment, the sensor area 330d may be additionally arranged in at least some portions of the second housing structure 320, or may be replaced with another one. For example, the sensor area 330d may include a camera hole area, a sensor hole area, an Under Display Camera (UDC) area, an Under Display Sensor (UDS) area, and the like. The sensor area 330d is illustrated as an example, and the existence of the sensor area 330d or a location and/or a shape thereof may be variously modified.

In an embodiment, while the electronic device 300 is in the unfolded state, the first housing structure 310 may be connected to the hinge structure (e.g., 364 of FIG. 4) described in more detail below, and may include a first surface 311 facing the front surface of the electronic device 300, a second surface 312 facing a surface opposite to the first surface 311, and a first lateral member 313 surrounding (e.g., around a periphery of) at least a portion of a space between the first surface 311 and the second surface 312.

In an embodiment, the first lateral member 313 may include a first side surface 313a arranged in parallel with the folding axis (e.g., the A axis), a second side surface 313b extending from an end portion of the first side surface 313a in a direction perpendicular to the folding axis, and a third surface 313c extending from the other end portion of the first side surface 313a in the direction perpendicular to the folding axis.

While the electronic device 300 is in the unfolded state, the second housing structure 320 may be connected to the hinge structure 364 described in more detail below, and may include a third surface 321 arranged to face the front surface of the electronic device 300, a fourth surface 322 facing a surface opposite to the third surface 321, and a second lateral member 323 surrounding (e.g., around a periphery of) at least a portion of a space between the third surface 321 and the fourth surface 322.

In an embodiment, the second lateral member 323 may include a fourth side surface 323a arranged in parallel with the folding axis (e.g., the A axis), a fifth side surface 323b extending from an end portion of the fourth side surface 323a in the direction perpendicular to the folding axis, and a sixth side surface 323c extending from the other end portion of the fourth side surface 323a in the direction perpendicular to the folding axis. In an embodiment, the third surface 321 may face the first surface 311 while the electronic device 300 is in the folded state.

The electronic device 300 may include a recess 301 formed to accommodate the display module 330 through a structural connection of the second housing structure 320 with the first housing structure 310. The recess 301 may have a size that is the same or substantially the same as that of the display module 330.

At least a portion of each of the first housing structure 310 and the second housing structure 320 may include a metal or non-metal material with a suitable rigidity selected to support the display module 330.

The first rear surface cover 340 may be arranged on the second surface 312 of the first housing structure 310, and may have a periphery that has a rectangular or substantially rectangular shape. At least a portion of the periphery may be surrounded by the first housing structure 310. Similarly, the second rear surface cover 350 may be arranged on the fourth surface 322 of the second housing structure 320, and at least a portion of a periphery of the second rear surface cover 350 may be surrounded by the second housing structure 320.

In an embodiment, the first rear surface cover 340 may be symmetrical or substantially symmetrical to the second rear surface cover 350 with respect to the folding axis (e.g., the A axis). In another embodiment, the first rear surface cover 340 and the second rear surface cover 350 may have different shapes from each other. The first rear surface cover 340 may be integrally formed with the first housing structure 310, and the second rear surface cover 350 may be integrally formed with the second housing structure 320.

In an embodiment, a space in which various components (e.g., a printed circuit board, an antenna module (e.g., an antenna or antenna circuit), a sensor module (e.g., a sensor), or a battery) of the electronic device 300 may be arranged may be provided through a structure in which the first rear surface 340, the second rear surface cover 350, the first housing structure 310, and the second housing structure 320 are connected to one another.

In an embodiment, one or more components may be arranged or visually exposed on the rear surface of the electronic device 300. For example, at least one component or sensor may be visually exposed through a first rear surface area 341 of the first rear surface cover 340. In various embodiments, the sensor may include a proximity sensor, a rear-facing camera module (e.g., a rear-facing camera) 382, and/or a flash. In another embodiment, at least a portion of a sub-display 352 (e.g., a second display) may be visually exposed through a second rear surface area 351 of the second rear surface cover 350. In another embodiment, the electronic device 300 may include a speaker module (e.g., a speaker) 353 arranged on at least some regions of the second rear surface cover 350.

The display module 330 may be arranged in a space formed by the pair of housing structures 310 and 320. For example, the display module 330 may be located in the recess 301 formed by the first and second housing structures 310 and 320, and may substantially occupy most part of the front surface of the electronic device 300. Therefore, the front surface of the electronic device 300 may include the display module 330, and some regions (e.g., peripheral regions) of the first housing structure 310 and some regions (e.g., peripheral regions) of the second housing structure 320, such that the first housing structure 310 and the second housing structure 320 are adjacent to the display module 330. In an embodiment, the rear surface of the electronic device 300 may include the first rear surface cover 340, some regions (e.g., peripheral regions) of the first housing structure 310 that are adjacent to the first rear surface cover 340, the second rear surface cover 350, and some regions (e.g., peripheral regions) of the second housing structure 320 that are adjacent to the second rear surface cover 350.

In an embodiment, the display module 330 may be a display in which at least some portions thereof may be changed to a plane or a curved surface. In an embodiment, the display module 330 may include a folding area 330c, a first area 330a located on a side (e.g., the right side) of the folding area 330c, and a second area 330b located on the other side (e.g., the left side) of the folding area 330c.

For example, the first area 330a may be arranged on the first surface 311 of the first housing structure 310, and the second area 330b may be arranged on the third surface 321 of the second housing structure 320.

In an embodiment, areas of the display module 330 are illustratively divided, and the display module 330 may be divided into multiple areas (e.g., at least four or two areas) according to the structure or function of the display module 330.

In an embodiment, the areas of the display module 330 may be divided according to the folding axis (e.g., the A axis) or the folding area 330c extending in parallel with the y axis. In another embodiment, the areas of the display module 330 may be divided according to another folding area (e.g., a folding area parallel with the x axis) or another folding axis (e.g., a folding axis parallel with the x axis). The area division in the display is merely a physical division by the pair of housing structures 310 and 320 and the hinge structure 364, and the display module 330 may be displayed or substantially displayed as one full screen through the housing structures 310 and 320 and the hinge structure 364.

In an embodiment, the first area 330a may be symmetrical or substantially symmetrical to the second area 330b with respect to the folding area 330c. In another embodiment, the first area 330a may be asymmetrical to the second area 330b. For example, the display module 330 may include a notch area in which at least a portion of the first area 330a is cut, a portion in which the first area 330a is symmetrical to or substantially symmetrical to the second area 330b, and a portion in which the first area 330a is asymmetrical to the second area 330b.

As shown in FIG. 3, the hinge cover 365 may be arranged between the first housing structure 310 and the second housing structure 320, and may cover an internal component (e.g., the hinge structure 364). Depending on the operation state of the electronic device 300 (e.g., whether the electronic device 300 is in the flat state or folded state), the hinge cover 365 may be covered by a portion of the first housing structure 310 and a portion of the second housing structure 320, or may be exposed to the outside.

When the electronic device 300 is in the flat state, the hinge cover 365 may be covered by the first housing structure 310 and the second housing structure 320, and thus, may not be exposed. For example, when the electronic device 300 is in the folded state (e.g., in the completely folded state), the hinge cover 365 may be externally exposed between the first housing structure 310 and the second housing structure 320. For example, when the electronic device 300 is in an intermediate state in which the first housing structure 310 and the second housing structure 320 are folded with a certain angle, the hinge cover 365 may be at least partially exposed to the outside of the electronic device 300 between the first housing structure 310 and the second housing structure 320. In this case, the exposed portions of the hinge cover 365 may be reduced compared to when the electronic device 300 is in the completely folded state. The hinge cover 365 may include a curved surface.

Hereinafter, operations of the first housing structure 310 and the second housing structure 320 and the respective areas of the display module 330 are described in more detail according to the operation state (e.g., the flat state and the folded state) of the electronic device 300.

In an embodiment, when the electronic device 300 is in the flat state, the first housing structure 310 and the second housing structure 320 may form a first angle (e.g., about 180°), and the first area 330a and the second area 330b of the display module 330 may be arranged to face in the same or substantially the same direction. Also, the folding area 330c may form the same or substantially the same plane as that of the first area 330a and the second area 330b. In another embodiment, when the electronic device 300 is in the flat state, the first housing structure 310 and the second housing structure 320 may rotate at a second angle (e.g., about 360°) with respect to each other, so that the second surface 312 and the fourth surface 322 are folded in an opposite way to face away from each other, and thus, the first area 330a and the second area 330b of the display module 330 may be arranged to face away from each other in the opposite direction.

In an embodiment, when the electronic device 300 is in the folded state, the first housing structure 310 may face the second housing structure 320. The first area 330a and the second area 330b of the display module 330 may form a narrow angle (e.g., an angle between about 0° and about 10°), and may face each other. For example, the folding area 330c may be a curved surface, at least a portion of which has a suitable curvature (e.g., a certain or predetermined curvature).

In an embodiment, when the electronic device 300 is in the intermediate state, the first housing structure 310 and the second housing structure 320 may be arranged at a certain angle (e.g., about 90°). The first area 330a and the second area 330b of the display module 330 may form an angle greater than an angle in the folded state and smaller than an angle in the unfolded state of the electronic device 300. At least a portion of the folding area 330c may be a curved surface with a suitable curvature (e.g., a certain or predetermined curvature), and the curvature may be smaller than a curvature in the folded state.

Figure 4:
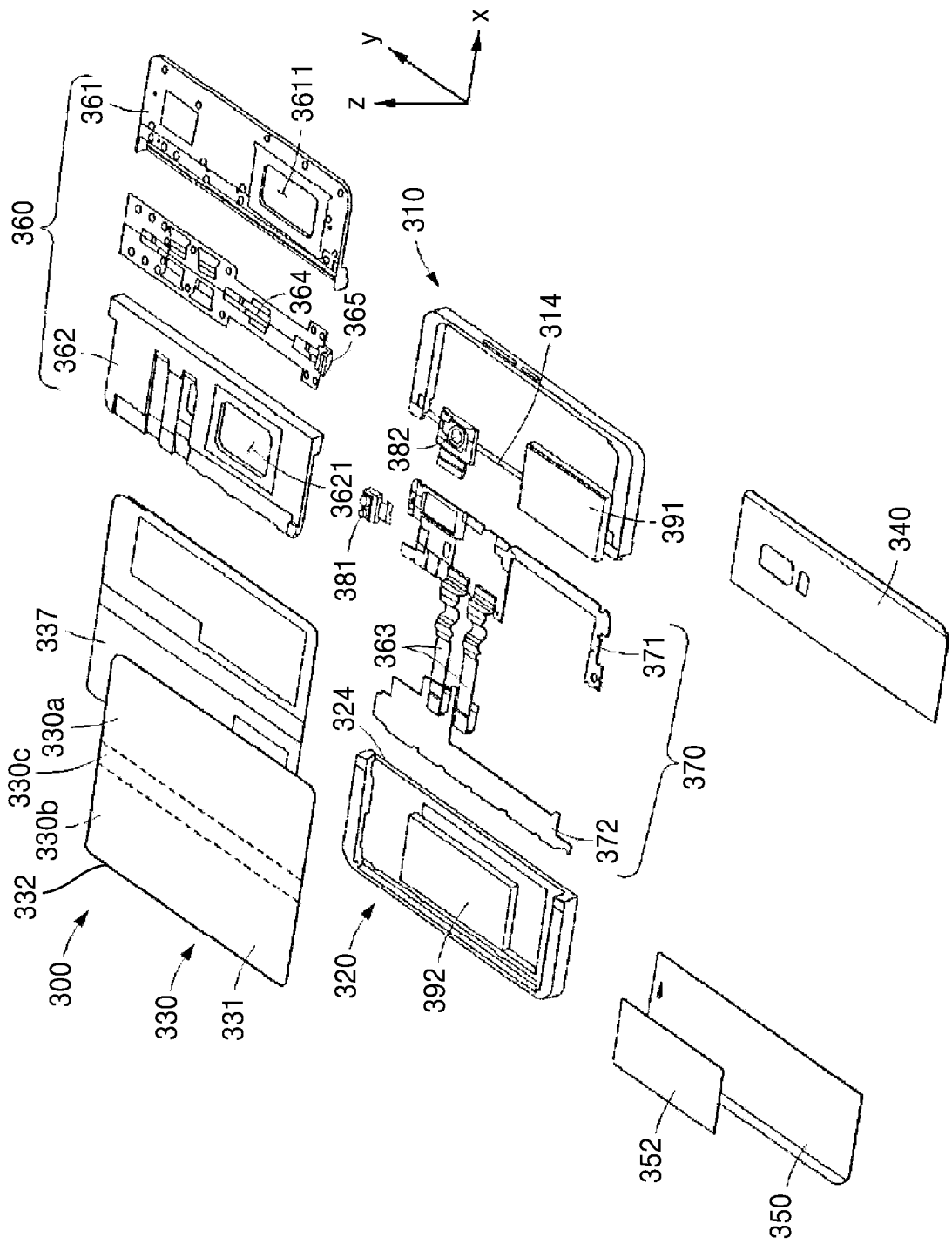
FIG. 4 is an exploded perspective view of the electronic device of FIGS. 2 and 3.

FIG. 4 is an exploded perspective view of the electronic device of FIGS. 2 and 3.

As shown in FIG. 4, the electronic device 300 may include the display module 330, a support member assembly 360, at least one printed circuit board 370, the first housing structure 310, the second housing structure 320, the first rear surface cover 340, and the second rear surface cover 350. In the present specification, the display module 330 may be referred to as a display or a display assembly. The display module 330 may include a display panel 332 (e.g., a flexible display panel), and at least one plate 337 or layer on which the display panel 332 is stably placed. In an embodiment, the at least one plate 337 may include a conductive plate (e.g., a copper (Cu) sheet or a stainless steel (SUS) sheet) arranged between the display panel 332 and the support member assembly 360. According to an embodiment, the conductive plate may be formed to have the same or substantially the same area as that of the display, and a portion of the conductive plate, which faces the folding area of the display, may be bent. The plate 337 may include at least one subsidiary material layer (e.g., a graphite member) arranged on a rear surface of the display panel 332. The plate 337 may have a shape corresponding to the display panel 332.

The support member assembly 360 may include a first support member 361 (e.g., a first support plate), a second support member 362 (e.g., a second support plate), the hinge structure 364 arranged between the first support member 361 and the second support member 362, the hinge cover 365 covering the hinge structure 364 when the hinge structure 364 is viewed from the outside, and at least one wiring member 363 (e.g., a Flexible Printed Circuit Board (FPCB)) crossing the first support member 361 and the second support member 362.

In an embodiment, the support member assembly 360 may be arranged between the plate 337 and at least one printed circuit board 370. For example, the first support member 361 may be arranged between the first area 330a of the display module 330 and a first printed circuit board 371. The second support member 362 may be arranged between the second area 330b of the display module 330 and a second printed circuit board 372.

In an embodiment, the wiring member 363 and at least a portion of the hinge structure 364 may be arranged in the support member assembly 360. The wiring member 363 may be arranged in a direction (e.g., the x-axis direction) crossing the first support member 361 and the second support member 362. The wiring member 363 may be arranged in a direction (e.g., the x-axis direction) that is perpendicular to or substantially perpendicular to the folding axis (e.g., the y axis or the folding axis A) of the folding area 330c.

In an embodiment, as described above, the at least one printed circuit board 370 may include the first printed circuit board 371 arranged on a side of the first support member 361, and the second printed circuit board 372 arranged on a side of the second support member 362. The first printed circuit board 371 and the second printed circuit board 372 may be arranged inside (e.g., within) the space formed by the support member assembly 360, the first housing structure 310, the second housing structure 320, the first rear surface cover 340, and the second rear surface cover 350. Components for performing various functions of the electronic device 300 may be mounted on the first printed circuit board 371 and the second printed circuit board 372.

In an embodiment, in a first space of the first housing structure 310, the first printed circuit board 371 may be located in the first space formed by the first support member 361, the first battery 391 facing a first swelling hole 3611 of the first support member 361, and at least one sensor module (e.g., at least one sensor) 381 or at least one camera module (e.g., at least one camera) 382. The at least one sensor module 381 or the at least one camera module 382 may be arranged at a location corresponding to the sensor area 330d or the first rear surface area 341 in the first space of the first housing structure 310.

In a second space of the second housing structure 320, the second printed circuit board 372 may be arranged in the second space formed by the second support member 362, and the second battery 392 arranged at a location facing a second swelling hole 3621 of the second support member 362. For example, the first housing structure 310 and the first support member 361 may be integrally formed with each other. For example, the second housing structure 320 and the second support member 362 may also be integrally formed with each other. For example, the sub-display 352 may be arranged in the second space of the second housing structure 320. For example, the sub-display 352 (e.g., the second display) may be arranged to be visible from the outside through at least some regions of the second rear surface cover 350.

The first housing structure 310 may include a first rotation support surface 314, and the second housing structure 320 may include a second rotation support surface 324 corresponding to the first rotation support surface 314. The first rotation support surface 314 and the second rotation support surface 324 may each have a curved surface corresponding to the curved surface of the hinge cover 365.

When the electronic device 300 is in the unfolded state, the first rotation support surface 314 and the second rotation support surface 324 may cover the hinge cover 365, and thus, the hinge cover 365 may not be exposed to the rear surface of the electronic device 300, or may be exposed to a minimum. In an embodiment, when the electronic device 300 is in the folded state, the first rotation support surface 314 and the second rotation support surface 324 may rotate along the curved surface of the hinge cover 365, and may expose the hinge cover 365 to the rear surface of the electronic device 300 to the maximum.

Figure 5:
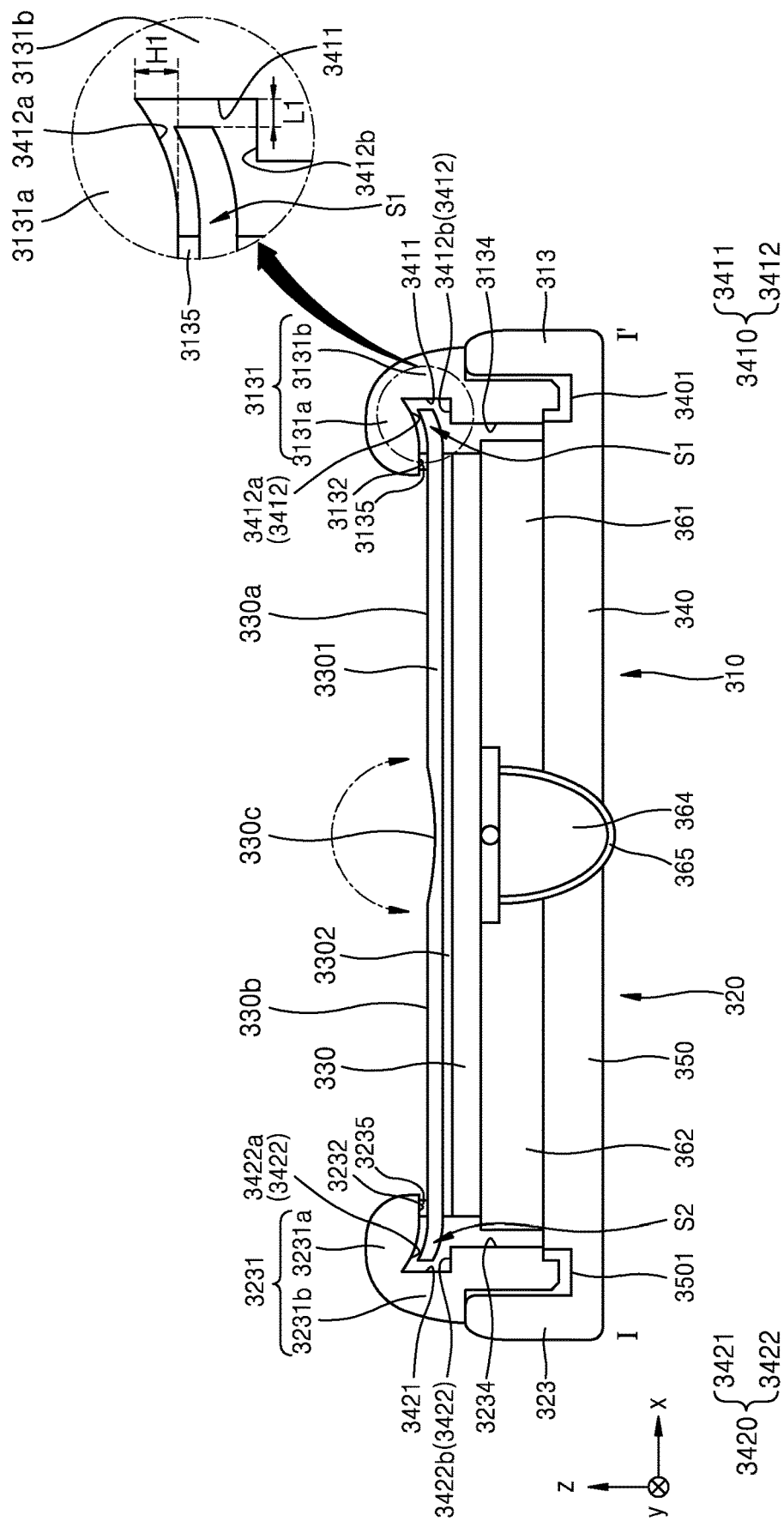
FIG. 5 is a schematic cross-sectional view of the electronic device taken along the line I-I' of FIG. 2.

FIG. 5 is a schematic cross-sectional view of the electronic device taken along the line I-I' of FIG. 2.

As shown in FIG. 5, the first housing structure 310 may surround a space formed by the first lateral member 313 and the first rear surface cover 340. The second housing structure 320 may surround a space formed by the second lateral member 323 and the second rear surface cover 350. The first support member 361 may be arranged in the space surrounded by the first housing structure 310, and the second support member 362 may be arranged in the space surrounded by the second housing structure 320.

The display module 330 may include a protective layer 3301 as a window, and the protective layer 3301 may be disposed over the display module 330. When viewed in a direction perpendicular to the display module 330 (e.g., in a plan view) while the electronic device 300 is in the unfolded state, an area of the protective layer 3301 may be greater than that of the display module 330.

The display module 330 may be disposed over the first support member 361 and the second support member 362. The first area 330a of the display module 330 may be supported by the first support member 361, and the second area 330b of the display module 330 may be supported by the second support member 362. The folding area 330c of the display module 330 may be arranged at a location corresponding to the hinge structure 364 or the hinge cover 365.

The first area 330a and the second area 330b of the display module 330 may be arranged on both sides (e.g., opposite sides) of the display module 330 with respect to the folding area 330c. The folding area 330c may be folded with respect to the folding axis extending in a first direction (e.g., the y-axis direction), and the first area 330a and the second area 330b of the display module 330 may be non-folding areas.

The electronic device 300 may include housing decorations 3131 and 3231 that cover at least some portions of the display module 330 and at least some portions of the protective layer 3301. The first housing decoration 3131 may cover at least some portions of the display module 330 from an upper portion of the first lateral member 313, and a first sealing member 3135 may be attached to a portion of the first housing decoration 3131 that covers at least a portion of an edge portion of the display module 330.

The second housing decoration 3231 may cover at least some portions of the display module 330 from an upper portion of the second lateral member 323, and a second sealing member 3235 may contact a portion of the second housing decoration 3231 that covers at least a portion of an edge portion of the display module 330. Also, the first and second sealing members 3135 and 3235 may not be attached and fixed to the edge portions of the display module 330. The first and second sealing members 3135 and 3235 may be soft, and may be configured to prevent or substantially prevent external foreign materials from being introduced to the inside of the electronic device 300. In some embodiments, however, the first and second sealing members 3135 and 3235 may be omitted as needed or desired.

The first housing decoration 3131 may include a first decoration head 3131a and a first decoration body 3131b. The first decoration body 3131b may be dented from an inner wall of the first rear surface cover 340, and connected to (e.g., attached to or coupled to) a first coupling groove 3401 formed at a corner where the first rear surface cover 340 meets the first lateral member 313. The first decoration head 3131a may extend from the first decoration body 3131b, and may cover at least some portions of the display module 330. The first sealing member 3135 may be attached to the first decoration head 3131a, and may prevent or substantially prevent foreign materials and the like from entering a space between the first housing decoration 3131 and the display module 330.

The second housing decoration 3231 may include a second decoration head 3231a and a second decoration body 3231b. The second decoration body 3231b may be dented from an inner wall of the second rear surface cover 350, and connected to (e.g., attached to or coupled to) a second coupling groove 3501 formed at a corner where the second rear surface cover 350 meets the second lateral member 323. The second decoration head 3231a may extend from the second decoration body 3231b, and may cover at least some portions of the display module 330. The second sealing member 3235 may be attached to the second decoration head 3231a, and may prevent or substantially prevent foreign materials and the like from entering a space between the second housing decoration 3231 and the display module 330.

The protective layer 3301 may be disposed over the display module 330, and may cover an upper surface of the display module 330. The protective layer 3301 may include edges including a first edge S1 and a second edge S2, which are arranged on both sides (e.g., opposite sides) of the protective layer 3301 with respect to the folding axis. The first edge S1 may face the first area 330a, and the second edge S2 may face the second area 330b.

The folding axis may be located between the first edge S1 and the second edge S2, and the first edge S1 and the second edge S2 may extend in a direction in which the folding axis extends. When the electronic device 300 is folded with respect to the folding axis, the first edge S1 and the second edge S2 may face each other. When viewed in the direction perpendicular to the display module 330 (e.g., in a plan view) while the electronic device 300 is in the unfolded state, the first edge S1 and the second edge S2 may be spaced apart from each other in a second direction (e.g., the x-axis direction) crossing the first direction that is the direction of which the folding axis extends.

The display module 330 may also include edges, and the edges of the display module 330 may correspond to the edges of the protective layer 3301, respectively.

The first edge S1 of the protective layer 3301 may protrude further than a side surface of the display module 330. Also, the second edge S2 of the protective layer 3301 may protrude further than the other side surface of the display module 330. As a result, an inner side surface of each of the first housing decoration 3131 and the second housing decoration 3231 may include a groove in which a corresponding one of the first edge S1 and the second edge S2 may be inserted.

The first edge S1 of the protective layer 3301 may be covered by the first housing decoration 3131, and the second edge S2 of the protective layer 3301 may be covered by the second housing decoration 3231. When viewed in the direction perpendicular to the display module 330 (e.g., in a plan view) while the electronic device 300 is in the unfolded state, an upper surface of the first edge S1 of the protective layer 3301 may be covered by the first housing decoration 3131, and an upper surface of the second edge S2 of the protective layer 3301 may be covered by the second housing decoration 3231.

The first housing decoration 3131 may cover a side surface of the display module 330, a side surface of the protective layer 3301, and the upper surface of the first edge S1 of the protective layer 3301. The second housing decoration 3231 may cover the other side surface of the display module 330, the other side surface of the protective layer 3301, and the upper surface of the second edge S2 of the protective layer 3301.

Also, the first housing decoration 3131 and the second housing decoration 3231 may expose at least a central portion of the protective layer 3301 and at least a central portion of the display module 330.

The display module 330 and the protective layer 3301 may be folded with respect to the folding axis. The direction in which the folding axis extends may be the first direction. An adhesive layer 3302 may be arranged between the display module 330 and the protective layer 3301, and the display module 330, the protective layer 3301, and the adhesive layer 3302 may be folded all together.

An inner side surface 3134 of the first housing decoration 3131 may include a first groove 3410. The first groove 3410 may be formed in a direction from the inner side surface 3134 of the first housing decoration 3131 towards the outside of the electronic device 300. The inner side surface 3134 of the first housing decoration 3131 may be dented in a direction towards the outside of the electronic device 300, and the first edge S1 of the protective layer 3301 may be inserted into the dented portion. In other words, the inner side surface 3134 of the first housing decoration 3131 may include the first groove 3410, which is a space corresponding to (e.g., accommodating) the first edge S1 of the protective layer 3301.

An inner side surface 3234 of the second housing decoration 3231 may include a second groove 3420. The second groove 3420 may be formed in a direction from the inner side surface 3234 of the second housing decoration 3231 towards the outside of the electronic device 300. The inner side surface 3234 of the second housing decoration 3231 may be dented in a direction towards the outside of the electronic device 300, and the second edge S2 of the protective layer 3301 may be inserted into the dented portion. In other words, the inner side surface 3234 of the second housing decoration 3231 may include the second groove 3420, which is a space corresponding to (e.g., accommodating) the second edge S2 of the protective layer 3301.

The second groove 3420 may correspond to the first groove 3410, and the characteristics of the second groove 3420 may be the same or substantially the same as those of the first groove 3410, except for a symmetrical direction.

The first housing decoration 3131 may cover the first edge S1 of the protective layer 3301 from an upper portion of the first lateral member 313. In other words, when viewed in the direction perpendicular to the display module 330 (e.g., in a plan view) while the electronic device 300 is in the unfolded state, the first housing decoration 3131 may cover the upper surface of the first edge S1 of the protective layer 3301 from the upper portion of the first lateral member 313.

The second housing decoration 3231 may cover the second edge S2 of the protective layer 3301 from an upper portion of the second lateral member 323. In other words, when viewed in the direction perpendicular to the display module 330 (e.g., in a plan view) while the electronic device 300 is in the unfolded state, the second housing decoration 3231 may cover the upper surface of the second edge S2 of the protective layer 3301 from the upper portion of the second lateral member 323.

The first housing decoration 3131 may include the first decoration head 3131a and the first decoration body 3131b. The first decoration body 3131b may be dented from the inner wall of the first rear surface cover 340, and may be connected to (e.g., attached to or coupled to) the first coupling groove 3401 formed at the corner where the first rear surface cover 340 contacts the first lateral member 313. The first decoration head 3131a may extend from the first decoration body 3131b, and may cover at least some portions of the display module 330.

The first decoration body 3131b may cover a side surface of the display module 330 and a side surface of the first edge S1. The first decoration head 3131a may extend in a direction parallel to or substantially parallel to the first area 330a of the display module 330 from the first decoration body 3131b, and may cover the upper surface of the first edge S1.

The second housing decoration 3231 may include the second decoration head 3231a and the second decoration body 3231b. The second decoration body 3231b may be dented from an inner wall of the second rear surface cover 350, and connected to (e.g., attached to or coupled to) the second coupling groove 3501 formed at a corner where the second rear surface cover 350 contacts the second lateral member 323. The second decoration head 3231a may extend from the second decoration body 3231b, and may cover at least some portions of the display module 330.

The second decoration body 3231b may cover the other side surface of the display module 330 and a side surface of the second edge S2. The second decoration head 3231a may extend in a direction parallel to or substantially parallel to the second area 330b of the display module 330 from the second decoration body 3231b, and may cover the upper surface of the second edge S2.

The first groove 3410 may be defined by a bottom surface 3411, and an inner circumferential surface 3412 surrounding (e.g., around a periphery of) the bottom surface 3411. The bottom surface 3411 of the first groove 3410 may be a surface facing one side surface of the protective layer 3301, and extending in the direction perpendicular to the display module 330 from among the surfaces defining the first groove 3410. The inner circumferential surface 3412 of the first groove 3410 may be formed to surround the bottom surface 3411 of the first groove 3410, spaced apart (e.g., separated) from the first edge S1 of the protective layer 3301, and surrounding (e.g., around a periphery of) the first edge S1 of the protective layer 3301.

The second groove 3420 may be defined by a bottom surface 3421, and an inner circumferential surface 3422 surrounding (e.g., around a periphery of) the bottom surface 3421. The bottom surface 3421 of the second groove 3420 may be a surface facing the other side surface of the protective layer 3301, and extending in the direction perpendicular to the display module 330 from among the surfaces defining the second groove 3420. The inner circumferential surface 3422 of the second groove 3420 may be formed to surround the bottom surface 3421 of the second groove 3420, spaced apart (e.g., separated) from the second edge S2 of the protective layer 3301, and surrounding (e.g., around a periphery of) the second edge S2 of the protective layer 3301.

When the electronic device 300 is in the unfolded state, a distance between the first edge S1 and the second edge S2 may be less than a distance between the bottom surface 3411 of the first groove 3410 and the bottom surface 3421 of the second groove 3420 (e.g., in the x-axis direction).

As shown in FIG. 5, a distance L1 between the bottom surface 3411 of the first groove 3410 and the first edge S1 of the protective layer 3301 may be greater than a distance in which the first edge S1 of the protective layer 3301 slides through a lip. For example, the distance in which the first edge S1 slides may be about 0.54 mm, and the distance L1 between the bottom surface 3411 of the first groove 3410 and the first edge S1 of the protective layer 3301 may be greater than about 0.54 mm. In an embodiment, the distance L1 between the bottom surface 3411 of the first groove 3410 and the first edge S1 of the protective layer 3301 may be greater than about 0.54 mm and less than about 0.7 mm. Such characteristics may also be applicable to the second edge S2 and the second groove 3420.

The inner circumferential surface 3412 of the first groove 3410 may be spaced apart from the first edge S1 of the protective layer 3301, and when viewed in the direction perpendicular to the display module 330 (e.g., in a plan view), the inner circumferential surface 3412 of the first groove 3410 may vertically cover the first edge S1 of the protective layer 3301.

A first-1 inner circumferential surface 3412a, which is an upper surface of the inner circumferential surface 3412 of the first groove 3410, may be a surface facing the upper surface of the first edge S1 of the protective layer 3301. A first-2 inner circumferential surface 3412b, which is a lower surface of the inner circumferential surface 3412 of the first groove 3410, may be a surface facing the lower surface of the first edge S1 of the protective layer 3301.

In other words, the first-1 inner circumferential surface 3412a, which is the upper surface of the inner circumferential surface 3412 of the first groove 3410, may face the upper surface of the first edge S1 of the protective layer 3301, and the first-2 inner circumferential surface 3412b, which is the lower surface of the inner circumferential surface 3412 of the first groove 3410, may face the lower surface of the first edge S1 of the protective layer 3301.

In this case, the first edge S1 of the protective layer 3301 may be located in the first groove 3410. The first edge S1 of the protective layer 3301 may be located in the first groove 3410, but may be spaced apart from the bottom surface 3411 of the first groove 3410 and the inner circumferential surface 3412 of the first groove 3410.

The inner circumferential surface 3422 of the second groove 3420 may be spaced apart from the second edge S2 of the protective layer 3301, and when viewed in the direction perpendicular to the display module 330 (e.g., in a plan view), the inner circumferential surface 3422 of the second groove 3420 may vertically cover the second edge S2 of the protective layer 3301.

A second-1 inner circumferential surface 3422a, which is an upper surface of the inner circumferential surface 3422 of the second groove 3420, may be a surface facing the upper surface of the second edge S2 of the protective layer 3301. A second-2 inner circumferential surface 3422b, which is a lower surface of the inner circumferential surface 3422 of the second groove 3420, may be a surface facing the lower surface of the second edge S2 of the protective layer 3301.

In other words, the second-1 inner circumferential surface 3422*a*, which is the upper surface of the inner circumferential surface 3422 of the second groove 3420, may face the upper surface of the second edge S2 of the protective layer 3301, and the second-2 inner circumferential surface 3422*b*, which is the lower surface of the inner circumferential surface 3422 of the second groove 3420, may face the lower surface of the second edge S2 of the protective layer 3301.

In this case, the second edge S2 of the protective layer 3301 may be located in the second groove 3420. The second edge S2 of the protective layer 3301 may be located in the second groove 3420, but spaced apart from the bottom surface 3421 of the second groove 3420 and the inner circumferential surface 3422 of the second groove 3420.

Shapes of the inner circumferential surface 3412 of the first groove 3410 and the inner circumferential surface 3422 of the second groove 3420 may be defined by considering the sliding movements of the first edge S1 and the second edge S2 of the protective layer 3301, the sliding movements being made during a folding operation. In other words, the shapes of the inner circumferential surface 3412 of the first groove 3410 and the inner circumferential surface 3422 of the second groove 3420 may correspond to the movements of the first edge S1 and the second edge S2 of the protective layer 3301, the movements being made during the folding operation.

For example, when the display module 330 or the electronic device 300 is folded from the unfolded state to the folded state, the first edge S1 of the protective layer 3301 may slide to the inside of the first groove 3410. In other words, when the display module 330 or the electronic device 300 is folded from the unfolded state to the folded state, the first edge S1 of the protective layer 3301 may become closer to the bottom surface 3411 of the first groove 3410.

On the other hand, when the display module 330 or the electronic device 300 is unfolded from the folded state to the unfolded state, the first edge S1 of the protective layer 3301 may slide from the inside of the first groove 3410 towards the outside (e.g., to the outside) thereof. In this case, an end portion (e.g., the first edge S1) of the protective layer 3301 may become farther away from the bottom surface 3411 of the first groove 3410, and may slide in a direction towards the folding axis. When the first groove 3410 does not exist, the protective layer 3301 may contact or collide with a housing structure, and thus, may be highly likely to be damaged.

The above example may be applied to the second groove 3420 in the same or substantially the same manner.

To realize a slim bezel, an area of the housing decoration may be reduced, when viewed in the direction perpendicular to the display module 330 (e.g., in a plan view) while the electronic device 300 is in the unfolded state. The housing decoration may protect the display module 330 by covering the side surfaces of the display module 330 and the edges of the protective layer 3301. Thus, although the area of the housing decoration may be decreased, the display module 330 should not be externally exposed.

According to one or more embodiments of the present disclosure, although the area of the housing decoration is decreased, lengths of the edges of the protective layer 3301 may extend, and the edges of the protective layer 3301 may be inserted into the grooves formed in the inner side surfaces of the housing decoration. As such, even though the area of the housing decoration may be decreased, the display module 330 may be fully protected by the housing decoration and the protective layer 3301, and thus, the upper surface of the display module 330 may not be externally exposed.

In other words, because the grooves are formed in the inner side surfaces of the housing decoration, the protective layer 3301 including the edges with sufficient lengths may be realized, and further, the electronic device 300 having a slim bezel may be realized. As the lengths of the edges of the protective layer 3301 increase, the protective layer 3301 may contact or collide with the housing decoration because of the sliding of the edges of the protective layer 3301, and thus, the protective layer 3301 may be damaged.

The protective layer 3301 may be folded together with the display module 330 or the electronic device 300. The distance between the bottom surface 3411 of the first groove 3410 and the first edge S1 of the protective layer 3301 in the folded state may be less than the distance between the bottom surface 3411 of the first groove 3410 and the first edge S1 of the protective layer 3301 in the unfolded state. In other words, the first edge S1 of the protective layer 3301 may slide inside the first groove 3410, and according to the sliding, the distance between the bottom surface 3411 of the first groove 3410 and the first edge S1 of the protective layer 3301 may change. Although the first edge S1 slides, the protective layer 3301 may not contact or collide with the bottom surface 3411 and the inner circumferential surface 3412 of the first groove 3410.

Because the sliding movement is made, the first edge S1 of the protective layer 3301 may not be fixed to other components to prevent or substantially prevent damage thereto. Therefore, the first edge S1 of the protective layer 3301 may be deformed by external power applied during the folding operation. In other words, because of the external power applied during the folding operation, the first edge S1 of the protective layer 3301 may be upwardly inclined with respect to a direction parallel to or substantially parallel to the first area of the display module 330. The first edge S1 of the protective layer 3301 may extend in the direction towards the outside of the electronic device 300, and be upwardly inclined. In this case, the upward inclination is measured based on a direction parallel to the first area of the display module 330, and formed towards the front surface of the electronic device 300.

When the first edge S1 of the protective layer 3301 is inclined in an upward manner, the first edge S1 of the protective layer 3301 may contact or collide with the inner circumferential surface 3412 of the first groove 3410. To prevent or substantially prevent such contact or collision, the inner circumferential surface 3412 of the first groove 3410 may have a shape corresponding to the first edge S1 of the protective layer 3301 that is inclined upwards.

The inner circumferential surface 3412 of the first groove 3410 may include the first-1 inner circumferential surface 3412*a* facing the upper surface of the first edge S1 of the protective layer 3301, and the first-2 inner circumferential surface 3412*b* facing the lower surface of the first edge S1 of the protective layer 3301. The first-1 inner circumferential surface 3412*a* may have a shape corresponding to the first edge S1 of the protective layer 3301. The first-1 inner circumferential surface 3412*a* may be upwardly inclined with respect to the direction parallel to the first area of the display module. The first-1 inner circumferential surface 3412*a* may be upwardly inclined in the direction towards the outside of the electronic device 300 (e.g., a direction outwards from the center of the protective layer 3301 or a direction farther away from the center of the protective layer 3301).

An upward inclination angle of the first-1 inner circumferential surface 3412*a* may be greater than or equal to an upward inclination angle of the first edge S1 of the protective layer 3301. In this case, an inclination angle may be an acute angle defined with respect to the first area or the second area of the display module 330.

In other words, in the cross-sectional view of the electronic device 300, the first-1 inner circumferential surface 3412*a* may be upwardly inclined in a direction away from the protective layer 3301 (or the display module 330). As the first-1 inner circumferential surface 3412*a* has the shape corresponding to the first edge S1 of the protective layer 3301, the contact or collision between the protective layer 3301 and the inner circumferential surface 3412 of the first groove 3410 may be prevented or substantially prevented while the first edge S1 of the protective layer 3301 slides. In other words, due to the physical characteristics of the inner circumferential surface 3412 of the first groove 3410, the inner circumferential surface 3412 of the first groove 3410 may be spaced apart from the protective layer 3301.

In more detail, the inner side surface of the first decoration body 3131*b* may include the first groove 3410 as described above, and the first groove 3410 may extend in the first direction along the first edge S1 of the protective layer 3301. In other words, the first groove 3410 may extend in the first direction along the first edge S1 of the protective layer 3301. In this case, the first-1 inner circumferential surface 3412*a* of the first groove 3410 may form a continuous or substantially continuous surface with a lower surface 3132 of the first decoration head 3131*a*. Because the first-1 inner circumferential surface 3412*a* of the first groove 3410 and the lower surface 3132 of the first decoration head 3131*a* form the continuous surface, it may seem, in the cross-sectional view, that the lower surface 3132 of the first decoration head 3131*a* is upwardly inclined in the direction farther away from the center of the protective layer 3301 or the folding axis. In some cases, a starting point of the upward inclination may be located on the lower surface 3132 of the first decoration head 3131*a*.

Also, because the range of the sliding of the protective layer 3301 may be limited, the contact or collision of the protective layer 3301 with the inner side surface of the first groove 3410 may be prevented or substantially prevented because (e.g., only because) the first-1 inner circumferential surface 3412*a* of the first groove 3410 has the upward inclination.

With respect to an extension line of the lower surface 3132 of the first decoration head 3131*a*, a height H1 of the upward inclination of the first-1 inner circumferential surface 3412*a* may be greater than or equal to a height of the upward inclination of the first edge S1 of the protective layer 3301. The height H1 of the upward inclination of the first-1 inner circumferential surface 3412*a* may be greater than or equal to about 0.1 mm and less than or equal to about 0.2 mm. When the height H1 of the upward inclination of the first-1 inner circumferential surface 3412*a* is less than about 0.1 mm, the first-1 inner circumferential surface 3412*a* may contact or collide with the first edge S1, and when the height H1 of the upward inclination of the first-1 inner circumferential surface 3412*a* is greater than about 0.2 mm, a problem may occur in the rigidity of the first decoration head 3131*a*. Such characteristics may be also be applied to the second decoration head 3231*a* and the second edge S2 of the protective layer 3301 in the same or substantially the same manner.

The first-2 inner circumferential surface 3412*b* of the first groove 3410 may extend in the direction farther away from the protective layer 3301 (or the display module 330). In this case, the first-2 inner circumferential surface 3412*b* may extend in a direction parallel to or substantially parallel to the first area 330*a* of the display module. In some embodiments, the first-2 inner circumferential surface 3412*b* may not be inclined with respect to the upper surface of the first area 330*a* of the display module 330. In other embodiments, the first-2 inner circumferential surface 3412*b* may also be inclined with respect to the upper surface of the first area 330*a* of the display module 330.

The above description regarding the first edge S1 and the first housing decoration 3131 may also be applied to the second edge S2 and the second housing decoration 3231 in the same or substantially the same manner, and characteristics of the first edge S1, the first housing decoration 3131, the second edge S2, and the second housing decoration 3231 may be the same or substantially the same as each other, except for the directions in which the first edge S1 and the first housing decoration 3131 and the second edge S2 and the second housing decoration 3231 are formed.

The protective layer 3301 may be folded together with the display module 330 or the electronic device 300. A distance between the bottom surface 3421 of the second groove 3420 and the second edge S2 of the protective layer 3301 in the folded state may be less than the distance between the bottom surface 3421 of the second groove 3420 and the second edge S2 of the protective layer 3301 in the unfolded state. In other words, the second edge S2 of the protective layer 3301 may slide inside the second groove 3420, and according to the sliding, the distance between the bottom surface 3421 of the second groove 3420 and the second edge S2 of the protective layer 3301 may change. Although the second edge S2 slides, the protective layer 3301 may not contact or collide with the bottom surface 3421 and the inner circumferential surface 3422 of the second groove 3420.

Because the sliding movement is made, the second edge S2 of the protective layer 3301 may not be fixed to other components to prevent or substantially prevent damage thereto. Therefore, the second edge S2 of the protective layer 3301 may be deformed by external power applied during the folding operation. In other words, because of the external power applied during the folding operation, the second edge S2 of the protective layer 3301 may be upwardly inclined with respect to a direction parallel to or substantially parallel to the second area of the display module. The second edge S2 of the protective layer 3301 may extend in the direction towards the outside of the electronic device 300, and may be upwardly inclined. In this case, the upward inclination is measured based on the direction parallel to the second area of the display module 330, and formed towards the front surface of the electronic device 300.

When the second edge S2 of the protective layer 3301 is inclined in an upward manner, the second edge S2 of the protective layer 3301 may contact or collide with the inner circumferential surface 3422 of the second groove 3420. To prevent or substantially prevent such contact or collision, the inner circumferential surface 3422 of the second groove 3420 may have a shape corresponding to the second edge S2 of the protective layer 3301 inclined upwards.

The inner circumferential surface 3422 of the second groove 3420 may include the second-1 inner circumferential surface 3422*a* facing the upper surface of the second edge S2 of the protective layer 3301, and the second-2 inner circumferential surface 3422*b* facing the lower surface of the second edge S2 of the protective layer 3301. The second-1 inner circumferential surface 3422*a* may have a shape corresponding to the second edge S2 of the protective layer 3301. The second-1 inner circumferential surface 3422*a* may be upwardly inclined with respect to the direction parallel to the second area of the display module. The second-1 inner circumferential surface 3422*a* may be upwardly inclined in the direction towards the outside of the electronic device 300 (or a direction outwards from the center of the protective layer 3301 or a direction farther away from the center of the protective layer 3301).

An upward inclination angle of the second-1 inner circumferential surface 3422*a* may be greater than or equal to an upward inclination angle of the second edge S2 of the protective layer 3301. In this case, an inclination angle may be an acute angle defined with respect to the second area of the display module 330.

In other words, in the cross-sectional view of the electronic device 300, the second-1 inner circumferential surface 3422*a* may be inclined upwards in the direction away from the protective layer 3301 (or the display module 330). As the second-1 inner circumferential surface 3422*a* has the shape corresponding to the second edge S2 of the protective layer 3301, the contact or collision between the protective layer 3301 and the inner circumferential surface 3422 of the second groove 3420 may be prevented or substantially prevented while the second edge S2 of the protective layer 3301 slides. In other words, due to the physical characteristics of the inner circumferential surface 3422 of the second groove 3420, the inner circumferential surface 3422 of the second groove 3420 may be spaced apart from the protective layer 3301.

In more detail, the inner side surface of the second decoration body 3231*b* may include the second groove 3420 as described above, and the second groove 3420 may extend in the first direction along the second edge S2 of the protective layer 3301. In this case, the second-1 inner circumferential surface 3422*a* of the second groove 3420 may form a continuous or substantially continuous surface with a lower surface 3232 of the second decoration head 3231*a*. Because the second-1 inner circumferential surface 3422*a* and the lower surface 3232 of the second decoration head 3231*a* form the continuous surface, it may seem, in the cross-sectional view, that the lower surface 3232 of the second decoration head 3231*a* is upwardly inclined in the direction farther away from the center of the protective layer 3301 or the folding axis. In some cases, a starting point of the upward inclination may be located on the lower surface 3232 of the second decoration head 3231*a*.

Also, because the range of the sliding of the protective layer 3301 may be limited, the contact or collision of the protective layer 3301 with the inner side surface of the second groove 3420 may be prevented or substantially prevented because (e.g., only because) the second-1 inner circumferential surface 3422*a* of the second groove 3420 has the upward inclination.

The second-2 inner circumferential surface 3422*b* of the second groove 3420 may extend in the direction farther away from the protective layer 3301 (or the display module 330). In this case, the second-2 inner circumferential surface 3422*b* may extend in a direction parallel to or substantially parallel to the second area of the display module. In some embodiments, the second-2 inner circumferential surface 3422*b* may not be inclined with respect to the upper surface of the second area of the display module 330. In other embodiments, the second-2 inner circumferential surface 3422*b* may also be inclined with respect to the upper surface of the second area of the display module 330.

Figure 6:
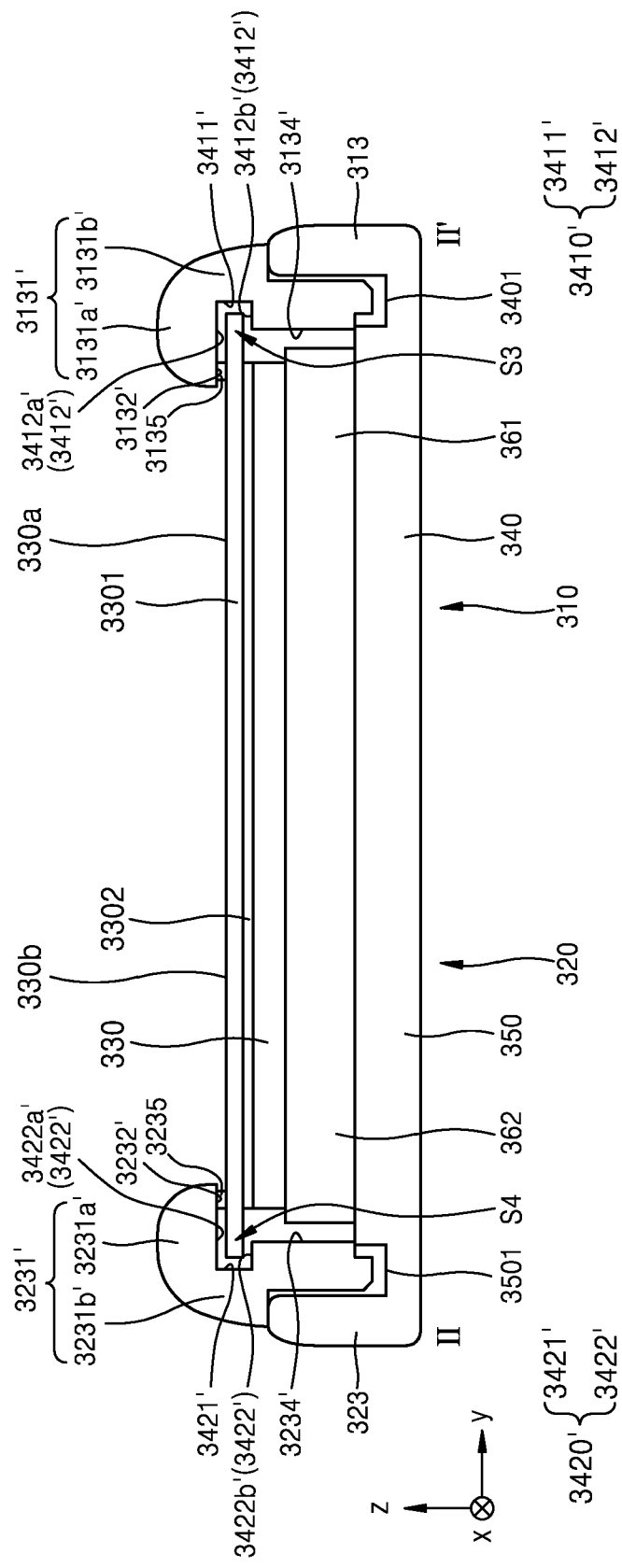
FIG. 6 is a schematic cross-sectional view of the electronic device taken along the line II-II' of FIG. 2.

FIG. 6 is a schematic cross-sectional view of the electronic device taken along the line II-II' of FIG. 2.

As shown in FIGS. 5 and 6, the electronic device 300 according to the present embodiment may include housing decorations 3131, 3231, 3131', and 3231' that cover at least some portions of the display module 330. The housing decorations 3131' and 3231' may be the same or substantially the same as (or similar to) the housing decorations 3131 and 3231 described above, and thus, redundant description thereof may not be repeated.

A third housing decoration 3131' may cover at least some portions of the display module 330 from the upper portion of the first lateral member 313, and the first sealing member 3135 may be attached to a portion of the third housing decoration 3131' that covers at least a portion of the upper surface of the edge portion of the display module 330.

The third housing decoration 3131' and the fourth housing decoration 3231' may extend in the second direction crossing the first direction in which the folding axis extends, and may be connect the first housing decoration 3131 to the second housing decoration 3231. The third housing decoration 3131' and the fourth housing decoration 3231' may be folded with respect to the folding axis during the folding operation performed with respect to the folding axis. When viewed in the direction perpendicular to the display module 330 (e.g., in a plan view) in the unfolded state, the third housing decoration 3131' and the fourth housing decoration 3231' may be spaced apart from each other in the first direction that is the direction of the folding axis.

The first sealing member 3135 may be attached to a third decoration head 3131*a'*, and may prevent or substantially prevent foreign materials and the like from entering a space between the third housing decoration 3131' and the display module 330. In some embodiments, the first sealing member 3135 may be omitted or replaced with other components that are not attached to the upper surface of the display module 330 or the upper surface of the protective layer 3301.

As shown in FIG. 6, the protective layer 3301 may extend in the second direction crossing the first direction in which the folding axis extends, and may further include a third edge S3 and a fourth edge S4, which connect the first edge S1 to the second edge S2. The third edge S3 and the fourth edge S4 may be folded with respect to the folding axis during the folding operation performed with respect to the folding axis. In the unfolded state, when viewed in the direction perpendicular to the display module 330 (e.g., in a plan view), the third edge S3 and the fourth edge S4 may be spaced apart from each other in the first direction that is the direction of the folding axis.

The third edge S3 of the protective layer 3301 may extend in the direction parallel to or substantially parallel to the first area 330*a* of the display module 330. Similarly, a third-1 inner circumferential surface 3412*a'* and a third-2 inner circumferential surface 3412*b'* of a third groove 3410' may extend in a direction parallel to or substantially parallel to the first area 330*a* of the display module 330. Also, the third-1 inner circumferential surface 3412*a'* and the third-2 inner circumferential surface 3412*b'* of the third groove 3410' may extend in the second direction crossing the first direction in which the folding axis extends.

Although the display panel 332 is folded with respect to the folding axis, a slip phenomenon may not occur in the third edge S3 extending in the second direction crossing the first direction in which the folding axis extends. Therefore, the third edge S3 may not be damaged during the folding operation.

In some embodiments, the third-1 inner circumferential surface 3412*a'* and the third-2 inner circumferential surface 3412*b'* of the third groove 3410' may be omitted or removed from the folding area 330*c*. In some embodiments, the third-1 inner circumferential surface 3412*a'* and the third-2 inner circumferential surface 3412b' of the third groove 3410' may disturb the folding operation.

The fourth housing decoration 3231' may cover at least some portions of the display module 330 from the upper portion of the second lateral member 323, and the second sealing member 3235 may be attached to a portion of the fourth housing decoration 3231' that covers at least a portion of an edge portion of the display module 330.

The second sealing member 3235 may be attached to the fourth decoration head 3231a', and may prevent or substantially prevent foreign materials and the like from entering a space between the fourth housing decoration 3231' and the display module 330.

In some embodiments, the second sealing member 3235 may be omitted or replaced with other components that are not attached to the upper surface of the display module 330 or the upper surface of the protective layer 3301.

As shown in FIG. 6, the fourth edge S4 of the protective layer 3301 may extend in a direction parallel to or substantially parallel to the second area 330b of the display module 330. Similarly, a fourth-1 inner circumferential surface 3422a' and a fourth-2 inner circumferential surface 3422b' of a fourth groove 3420' may extend in the direction parallel to or substantially parallel to the second area 330b of the display module 330. Also, the fourth-1 inner circumferential surface 3422a' and the fourth-2 inner circumferential surface 3422b' of the fourth groove 3420' may extend in the second direction crossing the first direction in which the folding axis extends.

In some embodiments, the fourth-1 inner circumferential surface 3422a' and the fourth-2 inner circumferential surface 3422b' of the fourth groove 3420' may be omitted or removed from the folding area 330c, because the fourth-1 inner circumferential surface 3422a' and the fourth-2 inner circumferential surface 3422b' of the fourth groove 3420' may disturb the folding operation, in some cases.

Although the display panel 332 is folded with respect to the folding axis, a slip phenomenon does not occur in the fourth edge S4 extending in the second direction crossing the first direction in which the folding axis extends. Therefore, the fourth edge S4 may not be damaged during the folding operation.

Figure 7:
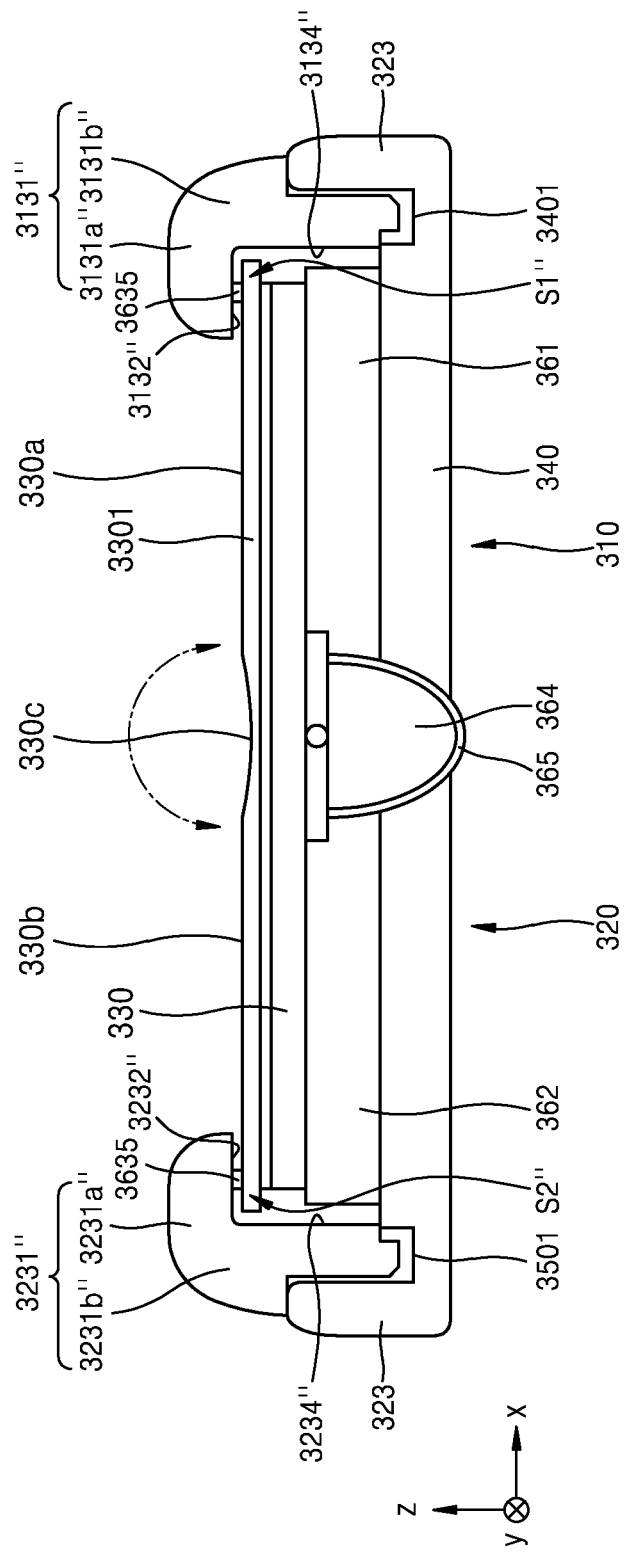
FIG. 7 is a schematic cross-sectional view showing a surrounding area of a housing decoration of an electronic device according to a comparative example.

FIG. 7 is a schematic cross-sectional view showing a surrounding area of a housing decoration of an electronic device according to a comparative example (Comparative Example). Hereinafter, redundant description of the components illustrated in FIG. 7 that are the same or substantially the same as those described above with reference to FIGS. 1 to 6 may not be repeated.

As shown in FIG. 7, a fifth housing decoration 3131" of the electronic device 300 according to the Comparative Example may not include a groove in an inner side surface 3134" thereof. In this case, a first edge S1" of the protective layer 3301 may contact or collide with the inner side surface 3134" of the fifth housing decoration 3131". Because the first edge S1" is arranged in parallel with the first direction in which the folding axis extends, the slip phenomenon may occur in the first edge S1" during the folding operation.

The first edge S1" of the protective layer 3301 of FIG. 7 may have a relatively smaller width than that of the first edge S1 of the protective layer 3301 of FIG. 5. In this case, because the width of the first edge S1" of the protective layer 3301 of FIG. 7 is relatively small, the fifth decoration head 3131a" of the fifth housing decoration 3131" extends to be closer to the center of the protective layer 3301 than that of the decoration heads 3131a and 3131a' of FIGS. 5 and 6. As a result, the electronic device 300 according to the Comparative Example has a wider bezel than that of the electronic device 300 of FIGS. 5 and 6.

As shown in FIG. 7, a sixth housing decoration 3231" of the electronic device 300 according to the Comparative Example may not include a groove in an inner side surface 3234" thereof. In this case, a second edge S2" of the protective layer 3301 may likely contact or collide with the inner side surface 3234" of the sixth housing decoration 3231". Because the second edge S2" is arranged in parallel with the first direction in which the folding axis extends, the slip phenomenon may occur in the second edge S2" during the folding operation.

The second edge S2" of the protective layer 3301 of FIG. 7 may have a relatively smaller width than that of the second edge S2 of the protective layer 3301 of FIG. 5. In this case, because a width of the second edge S2" of the protective layer 3301 of FIG. 7 is relatively small, the sixth decoration head 3231a" of the sixth housing decoration 3231" extends to be closer to the center of the protective layer 3301 than the decoration heads 3131a and 3131a' of FIGS. 5 and 6. As a result, the electronic device 300 according to the Comparative Example has a wider bezel than that of the electronic device 300 of FIGS. 5 and 6.

Figure 8:
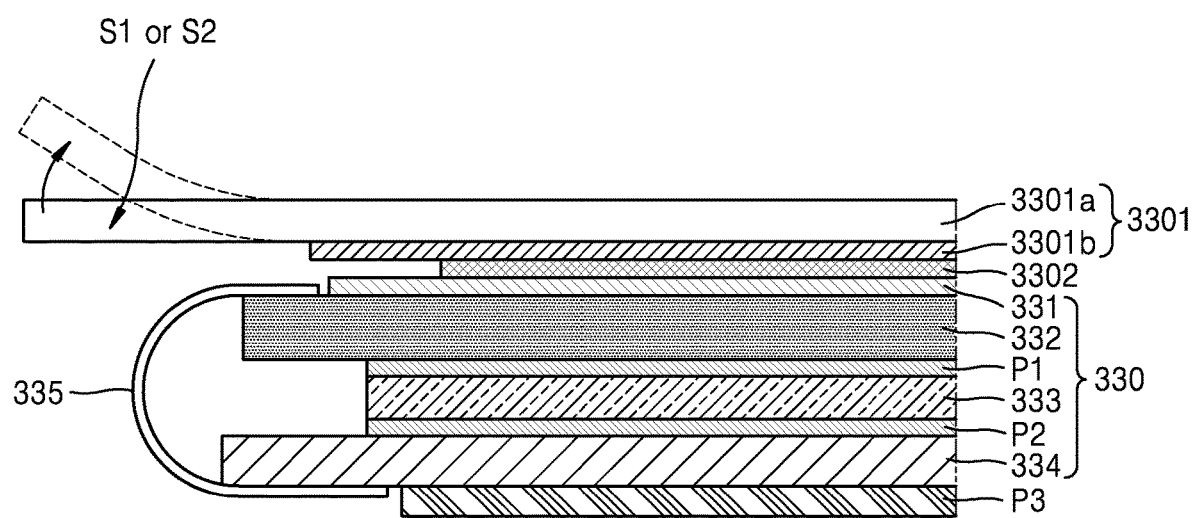
FIG. 8 is a schematic cross-sectional view of a surrounding area of a display module included in the electronic device of FIG. 1.

FIG. 8 is a schematic cross-sectional view of a surrounding area of a display module included in the electronic device of FIG. 1. Hereinafter, redundant description with respect to the components of FIG. 8 that are the same or substantially the same as those described above may not be repeated.

As shown in FIG. 8, the display module 330 may include the display panel 332, and an FPCB 335 extending from one end of the upper surface of the display panel 332 and attached to one end of the lower surface of a metal sheet layer 334.

The display module 330 may further include a polymer member 333 arranged under the display panel 332, a first adhesive layer P1 arranged between the display panel 332 and the polymer member 333, and a second adhesive layer P2 arranged between the polymer member 333 and the metal sheet layer 334. In addition, an adhesive layer P3 arranged under the display module 330, and configured to attach another component to the display module 330, may be further included. The adhesive layers P1, P2, and P3 may each include at least one of an Optical Clear Adhesive (OCA), a Pressure Sensitive Adhesive (PSA), a heat-reactive adhesive, a general adhesive, or a double-sided tape.

Dark colors (e.g., such as black) may be applied to the polymer member 333, and help the background demonstration when the display is off. For example, the polymer member 333 may absorb impacts from the outside of the electronic device 300, and thus, may function as a cushion for preventing or substantially preventing damage to the display module 330.

The metal sheet layer 334 may help reinforce the electronic device 300, and may be used to block ambient noise and disperse heat emitted from peripheral heat radiation components. For example, the metal sheet layer 334 may include at least one of Steel Use Stainless (SUS) (e.g., stainless steel (STS)), copper (Cu), aluminum (Al), or CLAD (e.g., a laminated member in which SUS and Al are alternately stacked). Also, the metal sheet layer 334 may include other suitable alloy materials.

The FPCB 335 is a flexible printed circuit board, and may be attached to the rear surface of the display module 330, or some regions of the rear surface of the metal sheet layer 334 forming the rear surface of the display module 330, from the upper surface of the display panel 332.

According to an embodiment, a folded portion of the FPCB 335 may protrude more than the metal sheet layer 334 in a direction from the display panel 332 to the housing structure. Therefore, during the behavior of the display module 330 due to the external impact, the folded portion of the FPCB 335 may be linearly hit.

Therefore, the folded portion of the FPCB 335, which is arranged to further protrude than the metal sheet layer 334, may contact the inner side surface of the housing structure first, and thus, may be linearly hit, and a relatively small impact may be applied to the display panel 332, and thus, the display panel 332 may be protected from damage.

The display module 330 may further include a polarization layer 331 disposed above the display panel 332. The polarization layer 331 may only penetrate (e.g., transmit) light, which vibrates in a direction that is the same as a polarization axis, from among the light emitted from a display layer of the display panel 332, and may absorb or reflect light vibrating in other directions. The polarization layer 331 may include a retardation film that changes linearly polarized light into circularly polarized light, or circularly polarized light into linearly polarized light, by applying a phase difference of $\lambda/4$ to two polarization components that are perpendicular to each other, and a polarization film that aligns a direction of light passing through the retardation film, divides the light into two polarization components that are orthogonal to each other, passes through one polarization component, and absorbs or disperses the other polarization component. In some embodiments, the polarization layer 331 may be omitted as needed or desired.

The protective layer 3301 may be disposed over the display module 330. The protective layer 3301 may include a polymer layer 3301a and a glass layer 3301b. The polymer layer 3301a may include PET or polyimide.

The glass layer 3301b may be disposed under the polymer layer 3301a. The glass layer 3301b may include Ultra Thin Glass (UTG). As the polymer layer 3301a may be greater in size than that of the glass layer 3301b, the polymer layer 3301a may protect the glass layer 3301b. When the glass layer 3301b is damaged, the polymer layer 3301a may prevent or substantially prevent pieces of glass from being scattered. Therefore, the first edges S1 and S1" and the second edges S2 and S2" of the protective layer 3301 described above may indicate edges of the polymer layer 3301a.

The polymer layer 3301a may include protrusions protruding further than the glass layer 3301b in the second direction crossing the first direction in the unfolded state, and the protrusions may be indicated as the edges S1 or S2 of FIG. 8. The protrusions may include a first protrusion (e.g., corresponding to the first edge S1 of FIG. 8) that corresponds to the first area 330a of the display module 330, and a second protrusion (e.g., corresponding to the second edge S2 of FIG. 8) that corresponds to the second area 330b of the display module 330.

The first protrusion (e.g., corresponding to the first edge S1 of FIG. 8) may be upwardly inclined with respect to the direction parallel to or substantially parallel to the display module 330 in the unfolded state, and some portions of the first protrusion (e.g., corresponding to the first edge S1 of FIG. 8) may be located in the first groove 3410.

Similarly, the second protrusion (e.g., corresponding to the second edge S2 of FIG. 8) may be upwardly inclined with respect to the direction parallel to or substantially parallel to the display module 330 in the unfolded state, and some portions of the second protrusion (e.g., corresponding to the second edge S2 of FIG. 8) may be located in the second groove 3420.

An end portion of the polymer layer 3301a, which protrudes more than the glass layer 3301b, may be upwardly inclined due to various reasons, such as external power applied to the folding operation, external impact resulting from falling, and/or the like as described above with reference to FIG. 5 and the like. The end portion of the polymer layer 3301a may not adhere to the glass layer 3301b, and may be easily bent because of the characteristics of the materials included in the polymer layer 3301a.

Figure 9:
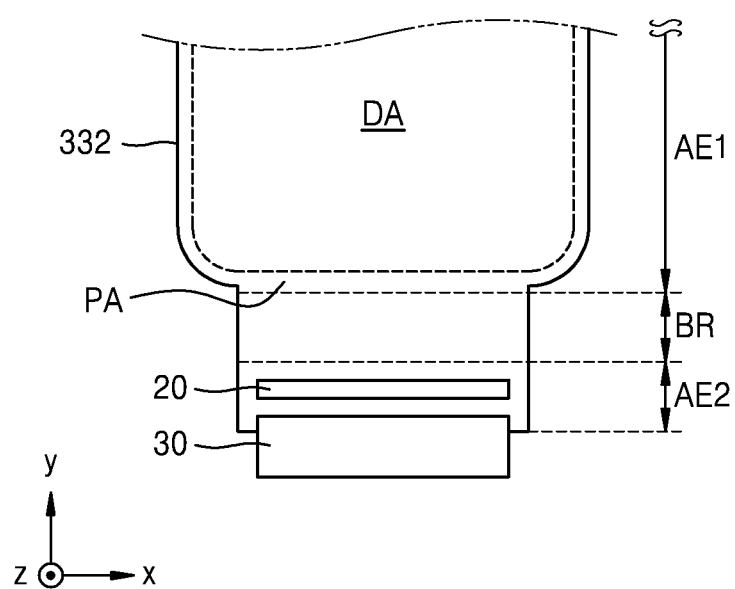
FIG. 9 is a schematic front view of a surrounding area of a bending area of a display panel included in the display module of FIG. 8.
Figure 10:
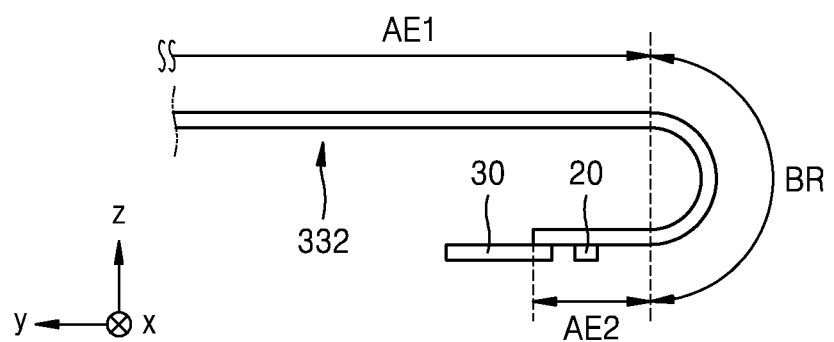
FIG. 10 is a schematic side view of a portion of the display panel of FIG. 9.

FIG. 9 is a schematic front view of a surrounding area of a bending area of a display panel included in the display module of FIG. 8, and FIG. 10 is a schematic side view of a portion of the display panel of FIG. 9.

The display panel 332 includes the display area DA, and the peripheral area PA outside the display area DA. The display area DA is an area where images are displayed, and a plurality of main pixels may be arranged therein. When viewed in a direction perpendicular to or substantially perpendicular to the display panel 332 (e.g., in a plan view), the display area DA may have various suitable shapes, such as a circle shape, an oval shape, a polygon shape, or other specific shapes. FIG. 9 shows that the shape of the display area DA is a rectangle or substantially a rectangle having rounded corners.

The peripheral area PA may be arranged outside the display area DA. A width of a portion of the peripheral area PA (e.g., in the x-axis direction) may be less than a width of the display area DA (e.g., in the x-axis direction). As described in more detail below based on the above structure, at least a portion of the peripheral area PA may be easily bent.

Because the display panel 332 includes the substrate (e.g., 100 of FIG. 12), the substrate 100 may be understood as including the display area DA and the peripheral area PA described above. Hereinafter, for convenience, it will be described that the substrate 100 includes the display area DA and the peripheral area PA.

The display panel 332 may also include a main area AE1, a bending area BR outside the main area AE1, and a sub-area AE2 arranged opposite to the main area AE1 with respect to the bending area BR. As shown in FIGS. 2 and 4, the display panel 332 is bent in the bending area BR, and thus, when viewed in the z-axis direction (e.g., in a plan view), a portion of the sub-area AE2 may overlap with the main area AE1. As described in more detail below, the sub-area AE2 may be or may include a non-display area. As the display panel 332 is bent in the bending area BR, when viewed from the front surface of the display panel 332 in the −z direction (e.g., in a plan view), the non-display area may not be viewed, or a viewed area of the non-display area may be minimized or reduced.

The driving chip 20 may be arranged in the sub-area AE2 of the display panel 332. The driving chip 20 may include an integrated circuit for driving the display panel 332. Such an integrated circuit may be a data driving integrated circuit for generating a data signal, but the present disclosure is not limited thereto.

The driving chip 20 may be mounted in the sub-area AE2 of the display panel 332. Although the driving chip 20 is mounted on the same surface as that of the display surface of the display area DA, because the display panel 332 is bent in the bending area BR as described above, the driving chip 20 may be disposed on a rear surface of the main area AE1.

The printed circuit board 30 and the like may be attached to an end portion of the sub-area AE2 of the display panel 332. The printed circuit board 30 and the like may be electrically connected to the driving chip 20 and the like through a pad on the substrate 100.

The display area DA is an area where images are displayed, and a plurality of main pixels may be arranged therein. Each main pixel may include a display element, such as an organic light-emitting diode. Each main pixel may emit, for example, red light, green light, or blue light. Such a main pixel may be connected to a pixel circuit including a Thin Film Transistor (TFT), a storage capacitor, and the like. The pixel circuit may be connected to a scan line SL configured to transmit a scan signal, a data line DL crossing the scan line SL and configured to transmit a data signal, a driving power line PL configured to supply a driving voltage, and the like. The scan line SL may extend in the x direction, and the data line DL and the driving power line PL may each extend in the y direction.

The main pixel may emit light having a brightness corresponding to an electrical signal transmitted from the pixel circuit electrically connected to the main pixel. In the display area DA, images may be displayed using light emitted from the main pixel. For reference, the main pixel may be defined as an emission area where any one of red light, green light, or blue light is emitted, as described above.

The main pixels may be electrically connected to outer circuits arranged in the peripheral area PA. In the peripheral area PA, a scan driving circuit, an emission control driving circuit, a terminal, a driving power supply line, an electrode power supply line, and the like may be arranged. The scan driving circuit may provide a scan signal to a pixel through a scan line. The emission control driving circuit may provide an emission control signal to a pixel through an emission control line. The terminal arranged in the peripheral area PA may not be covered by an insulating layer and may be exposed, thus being electrically connected to the printed circuit board 30. A terminal of the printed circuit board 30 may be electrically connected to the terminal of the display panel 332.

Figure 11:
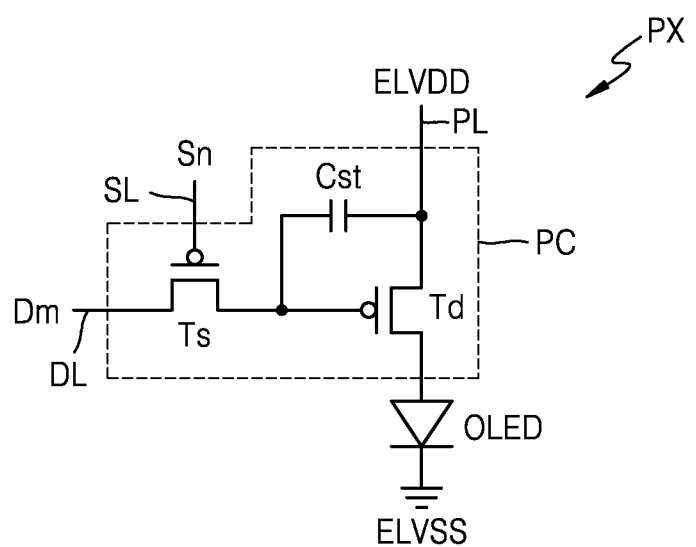
FIG. 11 is an equivalent circuit diagram of a pixel included in the display panel of FIG. 9.

FIG. 11 is an equivalent circuit diagram of a pixel included in the display panel of FIG. 9.

As shown in FIG. 11, a pixel PX (e.g., each of the pixels PX) includes a pixel circuit PC connected to the scan line SL and the data line DL, and the organic light-emitting diode OLED connected to the pixel circuit PC.

The pixel circuit PC may include a driving thin-film transistor Td, a switching thin-film transistor Ts, and a storage capacitor Cst. The switching thin-film transistor Ts may be connected to the scan line SL and the data line DL, and may be configured to transmit a data signal Dm, which is input through the data line DL, to the driving thin-film transistor Td in response to a scan signal Sn that is input through the scan line SL.

The storage capacitor Cst may be connected to the switching thin-film transistor Ts and the driving power line PL, and may be configured to store a voltage corresponding to a difference between a voltage from the switching thin-film transistor Ts and a first power voltage ELVDD (e.g., a driving voltage) provided to the driving power line PL.

The driving thin-film transistor Td may be connected to the driving power line PL and the storage capacitor Cst, and may be configured to control a driving current flowing in the organic light-emitting diode OLED from the driving power line PL, according to the voltage stored in the storage capacitor Cst. The organic light-emitting diode OLED may emit light having a desired brightness (e.g., a certain or predetermined brightness) because of the driving current.

FIG. 11 shows that the pixel circuit PC includes two transistors and one storage capacitor, but the present disclosure is not limited thereto. The pixel circuit PC may include two or more transistor and/or two or more storage capacitors.

Figure 12:
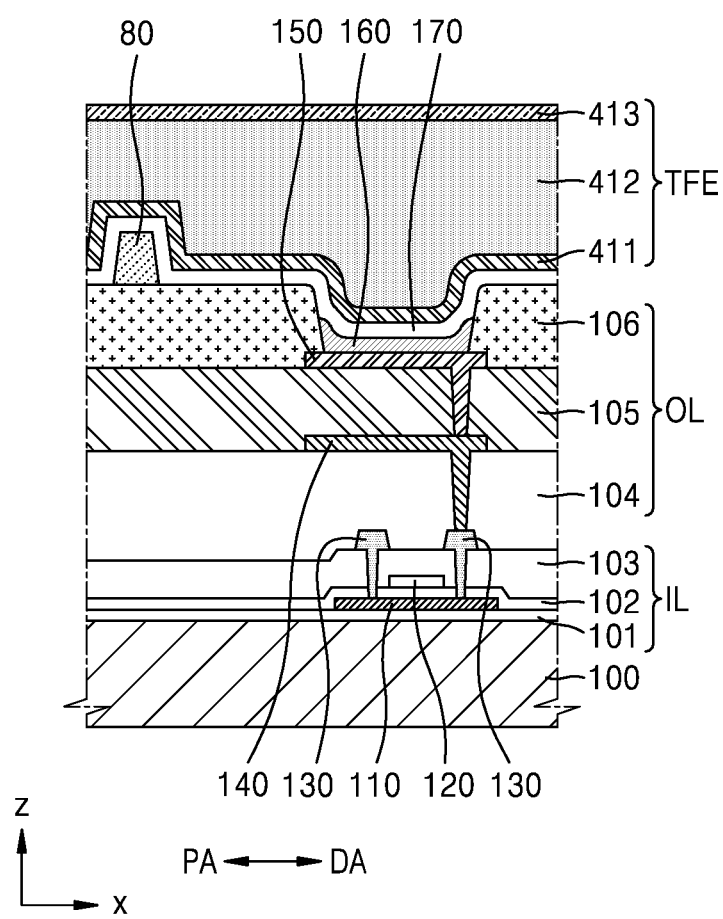
FIG. 12 is a schematic cross-sectional view of a portion of the display panel of FIG. 9.

FIG. 12 is a schematic cross-sectional view of a portion of the display panel of FIG. 9.

As described above, the substrate 100 may include areas corresponding to the display area DA and the peripheral area PA outside the display area DA. The substrate 100 may include various suitable materials that are flexible or bendable. For example, the substrate 100 may include glass, one or more metals, or a polymer resin. The polymer resin may include polyethersulphone, polyacrylate, polyetherimide, polyethylene naphthalate, polyethylene terephthalate, polyphenylene sulfide, polyarylate, polyimide, polycarbonate, or cellulose acetate propionate. Various suitable modifications may be made to the substrate 100, and for example, the substrate 100 may have a multilayered structure that includes two layers including the above polymer resin, and a barrier layer including an inorganic material (e.g., silicon oxide, silicon nitride, silicon oxynitride, or the like) and arranged between the two layers.

A buffer layer 101 may be disposed over the substrate 100. The buffer layer 101 may prevent or substantially prevent impurity ions from diffusing, and moisture and/or external air from penetrating, and may function as a barrier layer for flattening a surface and/or as a blocking layer. The buffer layer 101 may include silicon oxide, silicon nitride, or silicon oxynitride. Also, the buffer layer 101 may adjust a heat supply speed during a crystallization process of forming a semiconductor layer 110, and thus, the semiconductor layer 110 may be evenly crystallized.

The semiconductor layer 110 may be disposed over the buffer layer 101. The semiconductor layer 110 may include polysilicon. The semiconductor layer 110 may include a channel area that is not doped with impurities, and a source area and a drain area that are doped with impurities and arranged on both sides (e.g., opposite sides) of the channel area. The impurities may differ according to the kinds of the TFTs, and may be N-type impurities or P-type impurities.

A gate insulating layer 102 may be disposed over the semiconductor layer 110. The gate insulating layer 102 may be configured to secure the insulation between the semiconductor layer 110 and a gate layer 120. The gate insulating layer 102 may include an inorganic material, such as silicon oxide, silicon nitride, and/or silicon oxynitride, and may be arranged between the semiconductor layer 110 and the gate layer 120. Also, the gate insulating layer 102 may correspond to the entire substrate 100, and may have contact holes in suitable portions (e.g., predetermined portions). An insulating layer including an inorganic material may be formed through Chemical Vapor Deposition (CVD) or Atomic Layer Deposition (ALD), which is also applied to the embodiments below and modified examples thereof.

The gate layer 120 may be disposed over the gate insulating layer 102. The gate layer 120 may vertically overlap with the semiconductor layer 110, and may include at least one metal selected from among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), titanium (Ti), tungsten (W), and copper (Cu). The gate layer 120 is described in more detail below.

An interlayer insulating layer 103 may be disposed over the gate layer 120. The interlayer insulating layer 103 may cover the gate layer 120. The interlayer insulating layer 103 may include an inorganic material. For example, the interlayer insulating layer 103 may include a metal oxide or a metal nitride, and in more detail, the inorganic material may include silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZrO_2$). In some embodiments, the interlayer insulating layer 103 may have a dual structure including $SiO_x/SiN_y$, or $SiN_x/SiO_y$.

A first conductive layer 130 may be disposed over the interlayer insulating layer 103. The first conductive layer 130 may function as an electrode connected to source/drain areas of a semiconductor layer through a through hole included in (e.g., penetrating) the interlayer insulating layer 103.

The first conductive layer 130 may include one or more metals selected from among Al, Pt, Pd, Ag, Mg, Au, Ni, Nd, Ir, Cr, Li, Ca, Mo, Ti, W, and Cu. For example, the first conductive layer 130 may include a Ti layer, an Al layer, and/or a Cu layer.

A first organic insulating layer 104 may be disposed over the first conductive layer 130. The first organic insulating layer 104 may cover an upper portion of the first conductive layer 130, may have a flat or substantially flat upper surface, and thus, may be an organic insulating layer functioning as a planarization layer. The first organic insulating layer 104 may include an organic material, for example, such as acryl, benzocyclobutene (BCB), hexamethyldisiloxane (HMDSO), or the like. Various modifications may be made to the first organic insulating layer 104, for example, such as the first organic insulating layer 104 may be a layer or layers (e.g., a single layer or a plurality of layers).

The second conductive layer 140 may include one or more metals selected from among Al, Pt, Pd, Ag, Mg, Au, Ni, Nd, Ir, Cr, Li, Ca, Mo, Ti, W, and Cu. For example, the second conductive layer 140 may include a Ti layer, an Al layer, and/or a Cu layer.

A second organic insulating layer 105 may be disposed over the second conductive layer 140. The second organic insulating layer 105 may cover an upper portion of the second conductive layer 140, and may have a flat or substantially flat upper surface, and thus, may be an organic insulating layer functioning as a planarization layer. The second organic insulating layer 105 may include an organic material, for example, such as acryl, BCB, HMDSO, or the like. Various modifications may be made to the second organic insulating layer 105, for example, such as the second organic insulating layer 105 may be a layer or layers (e.g., a single layer or a plurality of layers).

Also, in some embodiments, an additional conductive layer and an additional insulating layer may be arranged between a conductive layer and a pixel electrode, and various embodiments may be made. In this case, the additional conductive layer may include the same material and have the same layer structure as those of the conductive layer described above. The additional insulating layer may include the same material and have the same layer structure as those of the organic insulating layer described above.

A pixel electrode 150 may be disposed over the second organic insulating layer 105. The pixel electrode 150 may be connected to the second conductive layer 140 through a contact hole formed in (e.g., penetrating) the second organic insulating layer 105. A display element may be disposed over the pixel electrode 150. The organic light-emitting diode OLED may be used as the display element. In other words, the organic light-emitting diode OLED may be disposed over, for example, the pixel electrode 150. The pixel electrode 150 may include a light-transmissive conductive layer including a light-transmissive conductive oxide, such as indium tin oxide (ITO), indium oxide ($In_2O_3$), or indium zinc oxide (IZO), and a reflection layer including a metal, such as Al or Ag. For example, the pixel electrode 150 may have a three-layered structure of ITO/Ag/ITO.

A pixel-defining layer 106 may be disposed over the second organic insulating layer 105, and arranged to cover edges of the pixel electrode 150. In other words, the pixel-defining layer 106 may cover the edges of the pixel electrode 150. The pixel-defining layer 106 may have an opening corresponding to a pixel, and the opening may expose at least a central portion of the pixel electrode 150.

The pixel-defining layer 106 may include, for example, an organic material, such as polyimide or HMDSO. Also, a spacer 80 may be disposed over the pixel-defining layer 106. While FIG. 12 shows that the spacer 80 is located in the peripheral area PA, the spacer 80 may also be in the display area DA. The spacer 80 may prevent or substantially prevent damage to the organic light-emitting diode OLED, which may be caused due to sagging of a mask, during a manufacturing procedure using the mask. The spacer 80 may include an organic insulating material, and may be a layer or layers (e.g., a single layer or a plurality of layers).

An intermediate layer 160 and the opposite electrode 170 may be disposed over the opening. The intermediate layer 160 may include a low-molecular-weight material or a high-molecular-weight material. When the intermediate layer 160 includes the low-molecular-weight material, the intermediate layer 160 may include a Hole Injection Layer (HIL), a Hole Transport Layer (HTL), an Electron Transport Layer (ETL), an Electron Injection Layer (EIL), and/or the like. When the intermediate layer 160 includes the high-molecular-weight material, the intermediate layer 160 may generally have a structure including the HTL and an emission layer EML. The opposite electrode 170 may include a light-transmissive conductive layer including a light-transmissive conductive oxide, such as ITO, $In_2O_3$, or IZO. The pixel electrode 150 may be used as an anode, and the opposite electrode 170 may be used as a cathode. The polarities of the pixel electrode 150 and the opposite electrode 170 may be applied in an opposite way.

The structure of the intermediate layer 160 is not limited to that described above, and may be variously modified. For example, at least one of the layers forming the intermediate layer 160 may be formed integrally with the opposite electrode 170 as a single body. In another embodiment, the intermediate layer 160 may include layers patterned to correspond to the pixel electrodes 150, respectively.

The opposite electrode 170 may be entirely disposed over the display area DA. In other words, the opposite electrode 170 may be integrally formed to cover a plurality of pixels. The opposite electrode 170 may electrically contact a common power supply line arranged in the peripheral area PA.

A thin-film encapsulation layer TFE may entirely cover the display area DA, and may extend towards the peripheral area PA, and thus, may cover at least a portion of the peripheral area PA. The thin-film encapsulation layer TFE may extend to the outside of a common power supply line.

The thin-film encapsulation layer TFE may include a first inorganic encapsulation layer 411, a second inorganic encapsulation layer 413, and an organic encapsulation layer 412 arranged therebetween. The first inorganic encapsulation layer 411 and the second inorganic encapsulation layer 413 may each include one or more inorganic materials selected from among Al$_2$O$_3$, TiO$_2$, Ta$_2$O$_5$, HfO$_2$, ZnO, SiO$_2$, SiNx, and SiON. The first inorganic encapsulation layer 411 and the second inorganic encapsulation layer 413 may each be a layer or layers (e.g., a single layer or a plurality of layers) including one or more of the above materials. The first inorganic encapsulation layer 411 and the second inorganic encapsulation layer 413 may include the same material as each other or different materials from each other.

A thickness of the first inorganic encapsulation layer 411 may be different from that of the second inorganic encapsulation layer 413. The thickness of the first inorganic encapsulation layer 411 may be greater than that of the second inorganic encapsulation layer 413. In another embodiment, the thickness of the second inorganic encapsulation layer 413 may be greater than or the same as that of the first inorganic encapsulation layer 411.

The organic encapsulation layer 412 may include a monomer-based material or a polymer-based material. The polymer-based material may include acrylic resin, epoxy-based resin, polyimide, polyethylene, and/or the like. In an embodiment, the organic encapsulation layer 412 may include acrylate.

According to one or more embodiments of the present disclosure as described above, a foldable electronic device having a slim bezel may be realized. However, the aspects and features of the present disclosure are not limited by these aspects and features.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:
   a display configured to be foldable with respect to a folding axis extending in a first direction, the display comprising:
      a folding area configured to be folded during a folding operation; and
      a first area and a second area at opposite sides with respect to the folding area;
   a protective layer above the display, and comprising a first edge located around the first area, and a second edge located around the second area; and
   a first housing decoration corresponding to the first area and covering an upper surface of the first edge, the first housing decoration having an inner side surface in which a first groove is located,
   wherein an inner circumferential surface of the first groove comprises a first-1 inner circumferential surface facing the upper surface of the first edge, the first-1 inner circumferential surface being upwardly inclined with respect to a direction parallel to the first area, and
   wherein the first edge is located in the first groove.

2. The electronic device of claim 1, wherein the inner circumferential surface of the first groove comprises a first-2 inner circumferential surface facing a lower surface of the first edge, and the first-2 inner circumferential surface extends in the direction parallel to the first area.

3. The electronic device of claim 2, wherein the first edge is upwardly inclined with respect to the direction parallel to the first area.

4. The electronic device of claim 3, wherein an angle of an upward inclination of the first-1 inner circumferential surface is greater than or equal to an angle of an upward inclination of the first edge.

5. The electronic device of claim 3, wherein an inner side surface of the first groove is spaced from the first edge.

6. The electronic device of claim 1, wherein, in a plan view in an unfolded state, an area of the protective layer is greater than an area of the display.

7. The electronic device of claim 1, wherein the first edge protrudes further than a side surface of the display.

8. The electronic device of claim 1, wherein, in a folded state, the first edge faces the second edge.

9. The electronic device of claim 1, further comprising a second housing decoration corresponding to the second area, the second housing decoration covering an upper surface of the second edge, and having an inner side surface in which a second groove is located,
   wherein an inner circumferential surface of the second groove comprises a second-1 inner circumferential surface facing an upper surface of the second edge, the second-1 inner circumferential surface being upwardly inclined with respect to a direction parallel to the second area, and
   wherein the second edge is located in the second groove.

10. The electronic device of claim 9, wherein, in a plan view in an unfolded state, the first edge and the second edge are located along a second direction crossing the first direction.

11. The electronic device of claim 9, wherein the second edge protrudes further than another side surface of the display.

12. The electronic device of claim 9, wherein a distance between the first edge and the second edge in an unfolded state is less than a distance between a bottom surface of the first groove and a bottom surface of the second groove in the unfolded state.

13. The electronic device of claim 1, wherein the first housing decoration comprises:
   a first decoration body covering a side surface of the display and a side surface of the first edge; and
   a first decoration head extending from the first decoration body in a direction parallel to the first area, and covering the upper surface of the first edge.

14. The electronic device of claim 13, wherein the first decoration body comprises the first groove in the inner side surface thereof, and the first-1 inner circumferential surface forms a continuous surface with a lower surface of the first decoration head.

15. The electronic device of claim 9, wherein the protective layer comprises:
   a glass layer over the display; and
   a polymer layer over the glass layer, and having a greater area than that of the glass layer in a plan view in an unfolded state.

16. The electronic device of claim 15, wherein, in the unfolded state, the polymer layer comprises a protrusion protruding further than the glass layer in a second direction crossing the first direction, and
    wherein the protrusion comprises a first protrusion corresponding to the first area, and a second protrusion corresponding to the second area.

17. The electronic device of claim 16, wherein the first protrusion is upwardly inclined with respect to a direction parallel to the display that is in the unfolded state.

18. The electronic device of claim 16, wherein a portion of the first protrusion is located in the first groove.

19. The electronic device of claim 16, wherein the second protrusion is upwardly inclined with respect to a direction parallel to the display that is in the unfolded state.

20. The electronic device of claim 16, wherein a portion of the second protrusion is located in the second groove.

* * * * *